(12) United States Patent
Cernigliaro et al.

(10) Patent No.: US 10,242,484 B1
(45) Date of Patent: Mar. 26, 2019

(54) UV MAPPING AND COMPRESSION

(71) Applicant: 8i Limited, Wellington (NZ)

(72) Inventors: Gianluca Cernigliaro, Wellington (NZ); Philip A. Chou, Culver City, CA (US); Eugene Joseph d'Eon, Wellington (NZ)

(73) Assignee: 8i Limited, Wellington (NZ)

( * ) Notice: Subject to any disclaimer, the term of this patent is extended or adjusted under 35 U.S.C. 154(b) by 0 days.

(21) Appl. No.: 15/786,298

(22) Filed: Oct. 17, 2017

(51) Int. Cl.
```
G06T 15/04      (2011.01)
G06T 9/00       (2006.01)
H04N 19/423     (2014.01)
H04N 19/186     (2014.01)
H04N 19/94      (2014.01)
```

(52) U.S. Cl.
CPC .............. *G06T 15/04* (2013.01); *G06T 9/008* (2013.01); *H04N 19/186* (2014.11); *H04N 19/423* (2014.11); *H04N 19/94* (2014.11)

(58) Field of Classification Search
CPC ....... G06T 15/04; G06T 9/008; H04N 19/186; H04N 19/423; H04N 19/94
See application file for complete search history.

(56) References Cited

U.S. PATENT DOCUMENTS

| | | | | |
|---|---|---|---|---|
| 8,396,309 | B2* | 3/2013 | Rasmusson | G06T 9/004 382/238 |
| 2002/0164074 | A1* | 11/2002 | Matsugu | G06K 9/48 382/173 |
| 2005/0162418 | A1* | 7/2005 | Kase | G06T 15/08 345/419 |
| 2017/0221263 | A1* | 8/2017 | Wei | G06T 17/20 |

OTHER PUBLICATIONS

Watkins, Getting Started in 3D with Maya, 2012, Elsevier Inc., ISBN: 978-0-240-82042-2, pp. 1-418.*
Collet, Alvaro, et al., "High-Quality Streamable Free-Viewpoint Video", ACM Trans. Graphics (SIGGRAPH), 34(4), (2015), 13 pgs.
Ortega, Antonio, et al., "Rate-distortion optimization for video compression", Signal Processing Magazine, IEEE 15 (6), (1998), 23-50.
Prada, Fabian, et al., "Spatiotemporal atlas parameterization for evolving meshes", ACM Transactions on Graphics (TOG), 36(4), Article 58, (2017), 1-12.

(Continued)

*Primary Examiner* — Samantha (Yuehan) Wang
(74) *Attorney, Agent, or Firm* — Schwegman Lundberg & Woessner, P.A.

(57) ABSTRACT

A machine can be specially configured to generate one or more atlases that include two-dimensional texture maps and their corresponding UV maps from a three-dimensional object, compress the atlases, decompress the atlases, store the atlases, access the atlases, communicate the atlases, apply the texture maps from the atlases to a three-dimensional model, or otherwise process the atlases, the texture maps, the UV maps, or any suitable combination thereof. The atlases, texture maps, UV maps, or any suitable combination thereof can be generated, compiled or otherwise created by the machine in a manner that is computationally efficient to compress and decompress using video compression and decompression techniques.

20 Claims, 26 Drawing Sheets
(5 of 26 Drawing Sheet(s) Filed in Color)

(56) References Cited

OTHER PUBLICATIONS

Sander, Pedro, et al., "Texture mapping progressive meshes", Proceedings of the 28th annual conference on Computer graphics and interactive techniques. ACM, (Aug. 2001), 409-416.

Sullivan, et al., "Rate-Distortion Optimization for Video Compression", IEEE Signal Processing Magazine, vol. 15, No. 6, (Nov. 2, 1998), 74-90.

Sullivan, Gary, et al., "Overview of the High Ef?ciency Video Coding (HEVC) Standard", EEE Transactions on Circuits and Systems for Video Technology, vol. 22, No. 12., (Dec. 2012), 1649-1668.

Sullivan, Gary, et al., "The H.264/AVC Advanced Video Coding Standard: Overview and Introduction to the Fidelity Range Extensions", Proceedings vol. 5558, Applications of Digital Image Processing XXVII, (2004), 454-474.

* cited by examiner

UV MAPPING AND COMPRESSION

TECHNICAL FIELD

The subject matter disclosed herein generally relates to the technical field of special-purpose machines that facilitate computer graphics, including software-configured computerized variants of such special-purpose machines and improvements to such variants, and to the technologies by which such special-purpose machines become improved compared to other special-purpose machines that facilitate computer graphics. Specifically, the present disclosure addresses systems and methods to facilitate "UV" mapping and compression of a UV map.

BACKGROUND

A machine can be configured to generate, compress, decompress, store, communicate, or otherwise process computer graphics that represent two-dimensional (2D) or three-dimensional (3D) objects. "UV mapping" is the process of generating a 2D UV map and a 2D texture map from a colored surface in 3D. A texture map is a 2D array of colored pixels used for texture mapping, which is the process of generating a colored surface in 3D from a UV map and a texture map. In this sense, UV mapping and texture mapping can be considers as inverses.

In computer graphics, a UV map refers to an assignment of each 3D point on a surface to a 2D point in a rectangular domain; that is, a UV map is a mathematical map from the coordinates of a 3D surface to the coordinates of a 2D image. For example, if the surface is represented by (e.g., expressed as) a list of surface elements (e.g., vertices, voxels, etc.), and the image is represented by a 2D array of pixels, then a UV map may be represented by a list of indices, the same length as the number of surface elements, indicating the index of the pixel in the image that corresponds to the surface element. UV mapping is the process of generating (e.g., from the list of surface elements) a list of correspondences along with an image (i.e., the texture map) such that the color of a surface element is equal to the color of its corresponding pixel in the texture map.

Mathematically, such an assignment can be represented by a function $f: S \to \mathcal{I}$ mapping 3D points on a surface $S \subset \mathbb{R}^3$ to 2D points in a rectangular domain $\mathcal{I} \in \mathbb{R}^2$. That is, the 2D point $(u, v) \in \mathcal{I}$ is assigned to the 3D point $(x, y, z) \in S$ if $(u, v) = f(x, y, z)$. Let $I(u, v)$ denote the color of an image at the point $(u, v) \in \mathcal{I}$, and let $S(x, y, z)$ denote the color of the surface at the point $(x, y, z) \in \mathcal{I}$. Here, to be concise, only color is discussed, but more general attributes besides color, such as transparency, normals, and the like, can be specified.

First, consider the technical problem of determining the color of the surface $C(r, g, b)$ at each point $(x, y, z)$ in a surface $S$, given an image $\{I(u, v) : (u, v) \in \mathcal{I}\}$ and a UV map $\{f(x, y, z) : (x, y, z) \in S\}$. This technical problem can be considered as a "forward" technical problem, for reasons that will become clear shortly. The technical solutions to this technical problem can be expressed in the following form:

$$C(x,y,z) = I(f(x,y,z)).$$

In computer graphics, the process of using this formula to render the color of a surface $S$ is called texture mapping, and the image $\{I(u, v):(u, v) \in \mathcal{I}\}$ is called a texture map. The surface $S$ is usually represented by a mesh $\mathcal{M} = (\mathcal{V}, \mathcal{F})$, where $\mathcal{V} = \{(x_n, y_n, z_n)\}$ is a list of vertices and $\mathcal{V} = \{(i_m, j_m, k_m)\}$ is a list of faces. Each vertex $(x_n, y_n, z_n) \in \mathcal{V}$ is a point in 3D and each face $(i_m, j_m, k_m) \in \mathcal{F}$ is a triple of indices into the list $\mathcal{V}$ of vertices. For conciseness and clarity, the discussion herein focuses on triangular meshes, but the systems and methods discussed herein are also applicable to more general polygonal meshes, such as quad meshes. The texture map $\{I(u, v):(u, v) \in \mathcal{I}\}$ is usually represented by a 2D array of pixels, and the UV map $\{f(x, y, z):(x, y, z) \in S\}$ is usually represented by coordinates $(u_n, v_n)$ in one-to-one correspondence with the vertices $(x_n, y_n, z_n)$ of the mesh. With these representations, if $(x, y, z) \in S$ is a 3D point on a face of the mesh, then it corresponds to a 2D point $f(x, y, z) = (u, v) \in \mathcal{I}$ as follows.

Suppose the face containing $(x, y, z)$ has vertices $(x_{n_1}, y_{n_1}, z_{n_1})$, $(x_{n_2}, y_{n_2}, z_{n_2})$, and $(x_{n_3}, y_{n_3}, z_{n_3})$, and suppose that $\alpha_1, \alpha_2, \alpha_3$ are barycentric coordinates of $(x, y, z)$, namely coefficients $0 \leq \alpha_1, \alpha_2, \alpha_3 \leq 1$ such that $$(x,y,z) = \alpha_1(x_{n_1}, y_{n_1}, z_{n_1}) + \alpha_2(x_{n_2}, y_{n_2}, z_{n_2}) + \alpha_3(x_{n_3}, y_{n_3}, z_{n_3}).$$

Then, $$f(x,y,z) = (u,v) = \alpha_1(u_{n_1}, v_{n_1}) + \alpha_2(u_{n_2}, v_{n_2}) + \alpha_3(u_{n_3}, v_{n_3}).$$

Thus, when a face on the surface is rasterized and rendered, each point $(x, y, z)$ on the face obtains its color by looking up the color in the image at the corresponding location $(u, v)$. Note that the point $(u, v)$ may not lie exactly at the center of a pixel, so interpolation of some kind may be used to look up the color.

For dynamic (e.g., time-varying) surfaces, typically the mesh vertices $(x_n(t), y_n(t), z_n(t))$ become functions of time and hence follow trajectories through space and time. Such a mesh can be called a dynamic or animated mesh. Typically, however, in a dynamic mesh, the UV coordinates $(u_n, v_n)$ remain constant. Thus a single texture map can be used for a dynamic mesh.

FIG. 1 is a conceptual diagram illustrating an example of UV mapping applied to a 3D object; that is, a process for determining a texture map $\{I(u, v):(u, v) \in \mathcal{I}\}$ and a UV map $\{f(x, y, z):(x, y, z) \in S\}$, given the color of the surface $C(x, y, z)$ at each point $(x, y, z)$ in a surface $S$, such that $C(x, y, z) = I(f(x, y, z))$ holds. This can be considered an "inverse" technical problem relative to the "forward" technical problem discussed above. The process for determining such a texture map and a UV map from a surface can thus be called UV mapping, which is illustrated in FIG. 1.

In UV mapping, for each 3D point $(x, y, z)$ on the surface $S$, a corresponding 2D point t $(u, v)$ on the texture map is determined, and the color $C(x, y, z)$ (e.g., yellow, red, light blue, or dark green, as shown in FIG. 1) is copied from the surface to the texture map as $I(u, v)$. Since the surface is usually represented by a mesh, the correspondence is usually determined by first determining, for each 3D vertex $(x_n, y_n, z_n)$ of each face of the mesh, a corresponding 2D point $(u_n, v_n)$ on the texture map. Then, the 2D point $(u, v)$ corresponding to a point $(x, y, z)$ on a face is obtained by calculating the barycentric coordinates of $(x, y, z)$ with respect to the vertices of the face. This correspondence constitutes a UV map.

Once the texture map and the UV map are determined (e.g., by solving the "inverse" problem), they can be used for texture mapping (e.g., to solve the "forward" problem, such as when texturing the surface of a 3D model of the original 3D object). The solution to the ("inverse") UV mapping problem is often not well-defined. That is, given the colors S on the surface $S$, there can be many choices of I and $f$ such that $C(x, y, z) = I(f(x, y, z))$.

FIG. 2 is a conceptual diagram illustrating examples of charting, which is one approach to solving the UV mapping problem by defining $f$ piecewise. That is, the domain of $f$, namely $S$, is partitioned into non-overlapping pieces $S_1$, $S_2$, $S_3$, . . . such that $\cup_k S_k = S$, and $f$ is defined separately on each piece. The process of determining how to partition $S$ into pieces $S_1$, $S_2$, $S_3$, . . . is called charting, which is illustrated in FIG. 2. In FIG. 2, boundaries between such non-overlapping pieces are shown in red.

FIG. 3 is a conceptual diagram illustrating an example of UV mapping applied to a specific charting. Once the pieces of $S$ are determined, the UV map $f$ is determined on each piece $S_1$, $S_2$, $S_3$, . . . . This process is called chart parametrization, and involves flattening each piece $S_k$ onto an image plane in such a way that the flattened pieces $f(S_k)$ do not overlap and such that there is little (e.g., minimal) local geometric distortion between the piece $S_k$ and its flattened version $f(S_k)$, which is illustrated in FIG. 3, using the same example colors described above with respect to FIG. 1 and FIG. 2.

The flattened pieces $f(S_k)$ are called charts, and the collection of charts is called an atlas, by analogy with a seafarer's maps of the Earth, in which different pieces of the Earth appear on each chart. Because the surface is often represented by a mesh, charting can involve partitioning the mesh into sub-meshes. Then, chart parametrization may include assigning a 2D point $(u_n, v_n)$ to each 3D vertex $(x_n, y_n, z_n)$ of each face of each sub-mesh. Then, the atlas becomes a texture map, which can be used to re-color the surface. Charting and chart parametrization are often done jointly, and such a joint process is sometimes called atlas parametrization. Atlas parametrization is thus a form of UV mapping. As used herein, "atlas" refers both to a texture map of charts, and also to a texture map of charts in combination with the UV map that underlies it; that is, atlas refers to a representation of the result or output or solution of atlas parametrization or the UV mapping problem.

Atlas parametrization may have a goal of minimizing the distortion resultant from the stretching of the texture. Stretching may be impossible to avoid when flattening a 3D mesh onto a 2D plane, but it can be minimized. Texture mapping quality and performance may therefore benefit from an atlas parametrization algorithm able to minimize such distortion. For example, a texture stretch metric can be used to calculate how much the distortion affects a certain 2D mapping. FIG. 4 is a conceptual diagram illustrating an example of how the texture of a 3D surface (a) can be stretched by an unrefined atlas parametrization (b) and how the minimization of the texture stretch metric improves the final result (c).

For dynamic surfaces, temporal coherence can also be important. Changes in the geometry and topology due to motion can cause overlapping and sharp changes of the 2D polygons. Moreover, if the dynamic mesh does not track the surface with sub-pixel accuracy, the colors of the surface can drift in the texture map, causing temporal incoherence of the texture map. Temporally consistent meshing is a way to maximize temporal coherence in the texture map.

Compression of texture maps as images is common in computer graphics. If the texture maps are time-varying, as they may be for dynamic surfaces, then compressing the texture maps as video can be done. Compression techniques for images and video can be efficient performed using algorithms such as Advanced Video Codec (AVC)/H.264 or High Efficiency Video Coding (HEVC)/H.265. Maximizing the temporal coherence of the texture maps is a good way to exploit the compression efficiency of the video coding methods, which generally have very high performance when they are able to remove the temporal redundancy of a video sequence.

Improvements to the quality of texture map compression may be obtained by applying tracking techniques. For example, a tracking method may start by choosing a key-frame, meshing it, and calculating the UV map for it. Then, the mesh of the key-frame is fit to the neighboring frames by projecting the texture components, which in the meanwhile have moved in the 3D space, over the same 2D area as the tracked colors of the key-frame. As a result of this strategy, when the atlas is compressed by a traditional 2D based video encoder, the reduced motion of the scene can be well exploited, providing better results for the same bit-rates.

FIG. 5 is a conceptual diagram illustrating an example comparison of a decompressed untracked atlas to a decompressed tracked atlas. The top row shows a decoded sequence representing an untracked atlas. The bottom row shows a decoded sequence representing a tracked atlas, as well as the quality improvement attained when the atlas is tracked.

Unfortunately, atlas parametrization is a computationally heavy process whose complexity increases with the Level of Detail (LOD) of the mesh representation of the 3D object. In addition, when the meshes are parametrized on a plane, the textures are affected by stretching distortions.

BRIEF DESCRIPTION OF THE DRAWINGS

The patent or application file contains at least one drawing executed in color. Copies of this patent or patent application publication with color drawings will be provided by the U.S. Patent and Trademark Office upon request and payment of the necessary fee.

Some embodiments are illustrated by way of example and not limitation in the figures of the accompanying drawings.

DETAILED DESCRIPTION

Figure 1:
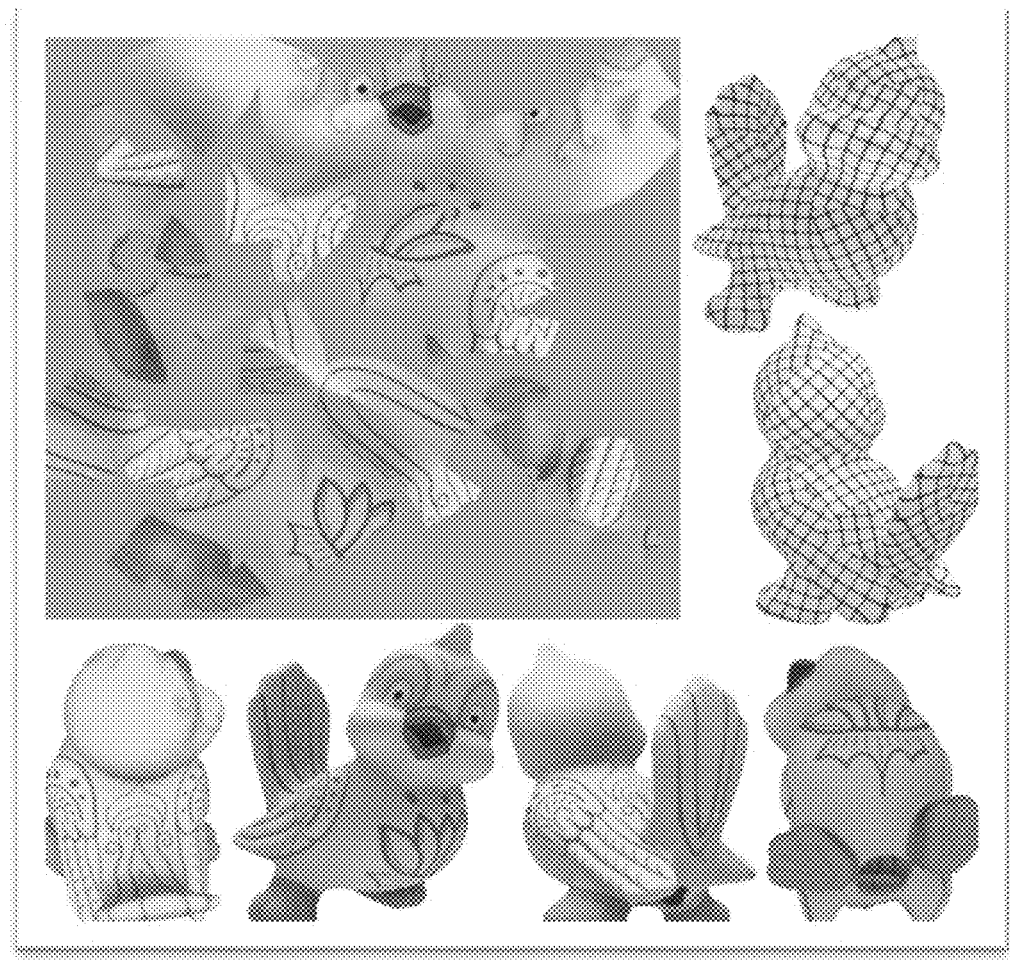
FIG. 1 is a conceptual diagram illustrating an example of UV mapping applied to a 3D object.
Figure 2:
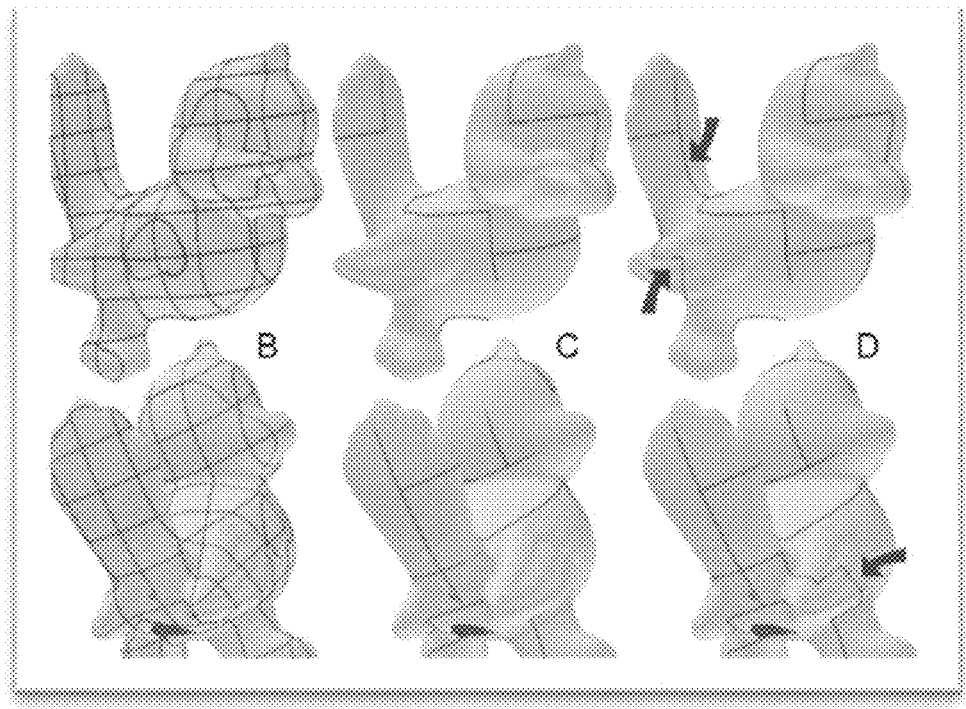
FIG. 2 is a conceptual diagram illustrating examples of charting.
Figure 3:
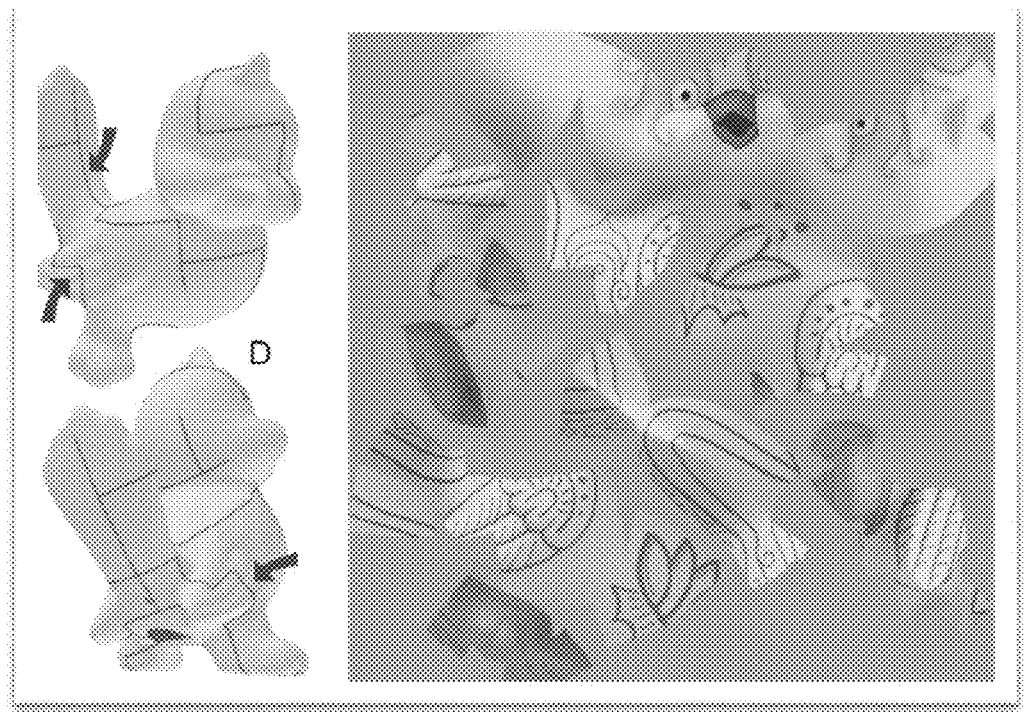
FIG. 3 is a conceptual diagram illustrating an example of UV mapping applied to a specific charting.
Figure 4:
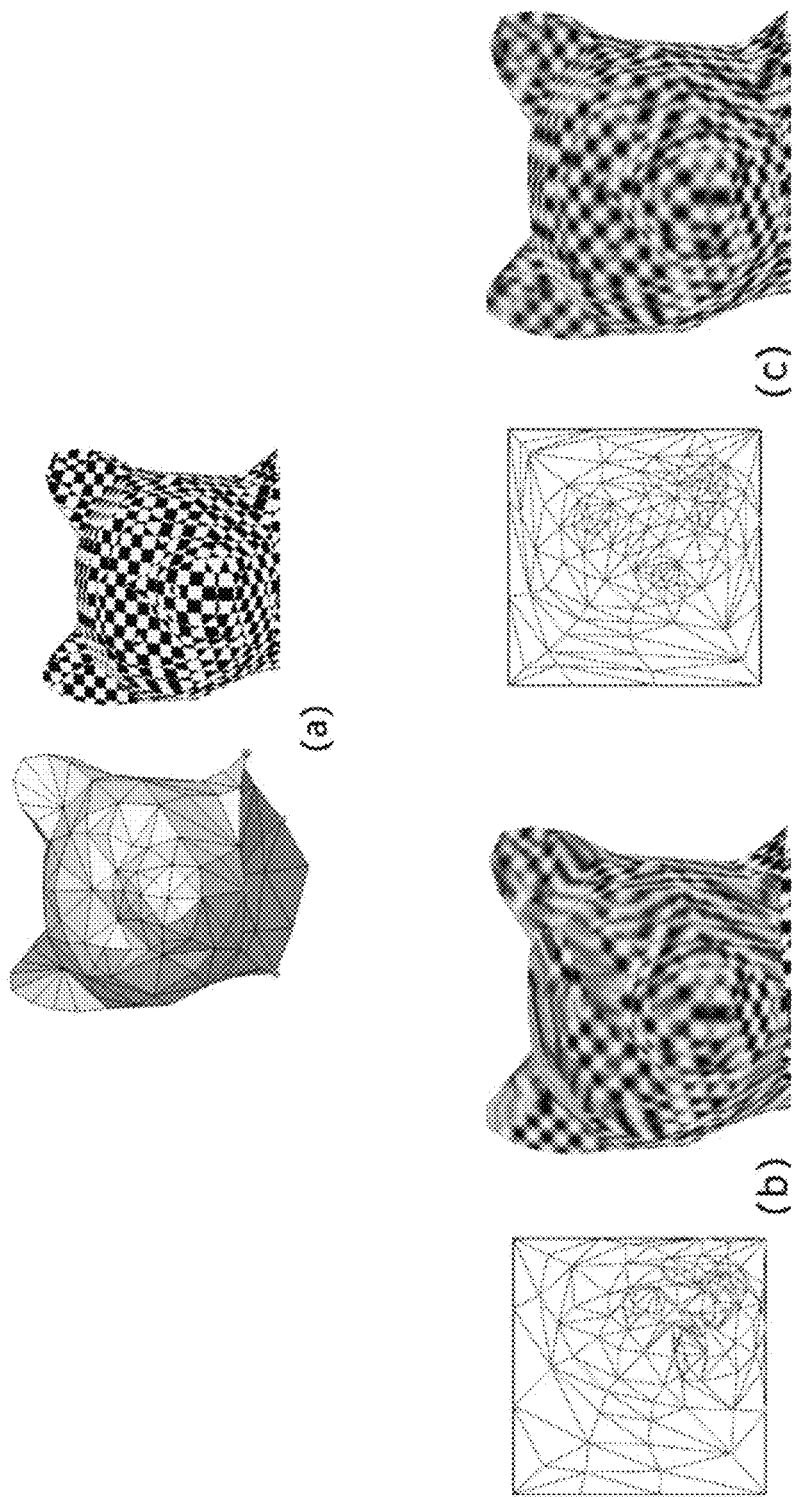
FIG. 4 is a conceptual diagram illustrating an example of how the texture of a 3D surface can be stretched by an unrefined atlas parametrization and how the minimization of the texture stretch metric improves the final result.
Figure 5:
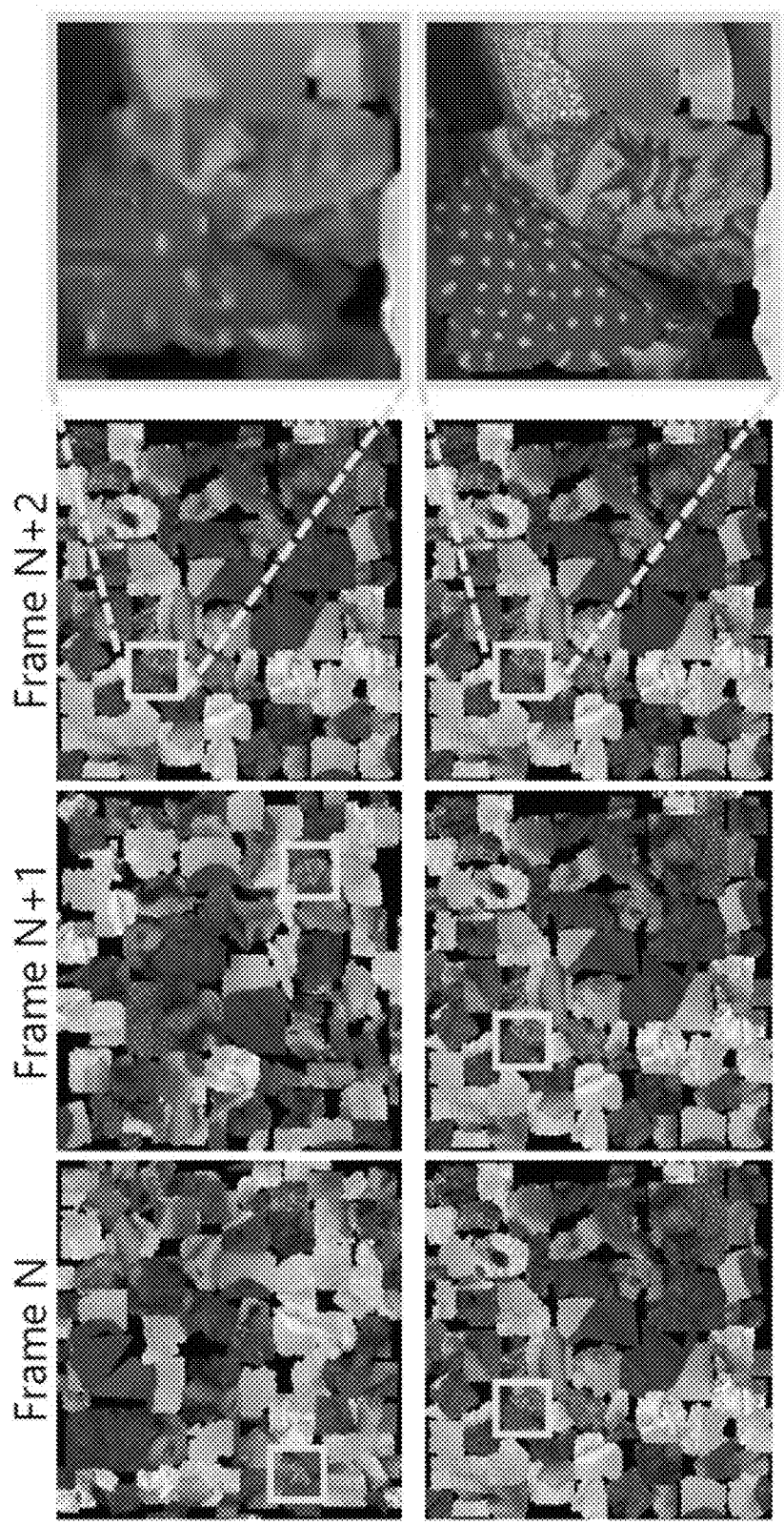
FIG. 5 is a conceptual diagram illustrating an example comparison of a decompressed untracked atlas to a decompressed tracked atlas.

Example methods (e.g., algorithms) facilitate UV mapping, compression of a UV map, or both, and example systems (e.g., special-purpose machines configured by special-purpose software) are configured to facilitate UV mapping, compression of a UV map, or both. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided. In the following description, for purposes of explanation, numerous specific details are set forth to provide a thorough understanding of various example embodiments. It will be evident to one skilled in the art, however, that the present subject matter may be practiced without these specific details.

The systems and methods described herein are specially configured to, inter alia, generate an atlas, including its underlying UV map, by using a direct orthogonal projection in place of parametrization and accordingly avoid conventional charting. In various example embodiments, these systems and methods enhance the atlas by performing a quad-tree-based voxel density analysis and grouping, in 2D, colors that were originally adjacent in 3D. In addition, the systems and methods described herein are less affected by the stretching issue, because the 2D mapping is performed with a direct orthogonal projection.

In particular, the systems and methods described herein are specially configured to generate, store, compress, decompress, communicate, or otherwise process a texture map in the form of a special data structure (e.g., a special memory-resident data structure or a special data stream) that represents an atlas (e.g., a texture map and a UV map) and can be applied independently on any kind of volumetric video (e.g., a time-varying 3D model, potentially having time-varying colors on its surface). The special data structure can be compressed or decompressed efficiently using a video codec.

Within the special data structure, texture colors are represented by evaluating a block-wise orthogonal projection, where each block is a cubic block CB with size N×N×N, and where each orthogonal projection of the cubic block is a square block SB with size N×N. The orthogonal projection of the cubic block is evaluated in the block's dominant direction, which is automatically chosen by machine from among the three axes of three-space (e.g., x, y, and z). The decision about the dominant directions is made by evaluating a 2D projection for each direction (e.g., normalizing one of the three coordinates) and choosing the direction that minimizes occlusions (e.g., minimizes occluded area). An alternative implementation is to take into account the inside and outside of the surface, in which case six possible dominant directions may be possible (e.g., +x, −x, +y, −y, +z, −z).

After the evaluation of each orthogonal projection, the 2D N×N blocks are grouped together to avoid excessive fragmentation of the atlas, which may reduce compression efficiency when compressed by a video encoder. In some example embodiments, a following step, called "filling," is performed to avoid the presence of edges due to empty areas that appear when the volumetric content (e.g., the 3D model) does not completely fill the N×N area in the dominant direction. In this filling operation, a color that corresponds to the average of the texture information of a cubic block is assigned to all of the empty pixels of the 2D images.

The 2D image is then processed by a video encoder, such as AVC/H.264 or HEVC/H.265, which generates a compressed binary data stream. The binary data stream can then be stored, communicated, and eventually decoded, such that a decompressed 2D image that contains the original texture information is recreated. At the decoder side (e.g., a client device), every projected area is reassigned to a set of 3D coordinates belonging to the volumetric video to recreate the 3D content. This process is then reproduced, repeating the evaluation of the dominant direction for each N×N 2D block and grouping the 2D blocks together. In this way, the systems and methods discussed herein obtain the 3D location of where to assign the color of each 2D pixel.

Following the above steps, it is possible to reduce the amount of information used to represent the texture colors of a volumetric video. In order to simplify the decoding process, an alternative solution can be implemented to avoid repeating the projection process at the decoder side. In this case, supplemental information (e.g., side information or other metadata) is added to the compressed data stream to indicate the sizes of the mapped 2D areas and their corresponding positions in the 3D space. This solution enables a very fast decoding process in exchange for slightly reduced compression efficiency.

Figure 6:
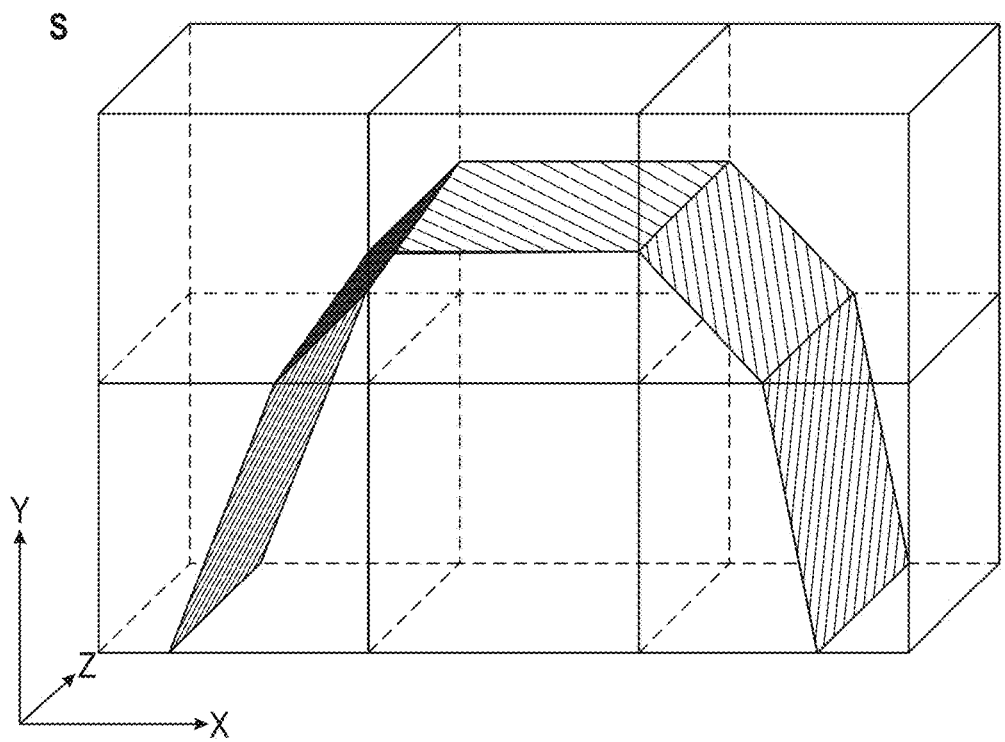
FIG. 6 is a conceptual diagram illustrating a 3D surface divided into cubic blocks, according to some example embodiments.

FIG. 6 is a conceptual diagram illustrating a 3D surface divided into cubic blocks, according to some example embodiments. As used herein, "volumetric content" is defined as a set of 3D points $\mathcal{S} \subset \mathbb{R}^3$. This set of points may informally be referred to as a surface, even if the set of points is not a 2D manifold embedded in 3D, an alternative notion of a surface.

The surface $\mathcal{S}$ can be represented in any number of ways, such as a mesh, point cloud, and the like. A mesh $\mathcal{M} = (\mathcal{V}, \mathcal{F})$ includes a set $\mathcal{V}$ and a set $\mathcal{F}$, where $\mathcal{V} = \{(x_n, y_n, z_n)\}$ is a list of vertices and $\mathcal{F} = \{(i_m, j_m, k_m)\}$ is a list of faces. A point cloud is just a set $\mathcal{V} = \{(x_n, y_n, z_n)\}$ of 3D points. The systems and methods discussed herein can be applied to any set of points or surface $\mathcal{S} \subset \mathbb{R}^3$ independently of its representation.

In accordance with the systems and methods discussed herein, the 3D surface $\mathcal{S}$ is subdivided into 3D cubic blocks. The colors of the 3D surface $\mathcal{S}$ are then represented in the 2D rectangular domain $\mathcal{I} \in \mathbb{R}^2$, which is created by grouping together 2D square blocks. When the type of block (e.g., 3D or 2D) is readily apparent from context, the word "block" or "blocks" may be used. A cubic block can be defined as the set of points (x, y, z) satisfying the condition:

$$CB = \left\{ (x, y, z) \mid x_0 - \frac{N}{2} < x \le x_0 + \frac{N}{2}, \right.$$
$$\left. y_0 - \frac{N}{2} < y \le y_0 + \frac{N}{2}, z_0 - \frac{N}{2} < z \le z_0 + \frac{N}{2} \right\}$$

where $(x_0, y_0, z_0)$ and N are, respectively, the center and the size of the edges of the block CB. When the size of the edge of the cubic blocks is fixed, the size of the side square blocks of the 2D image can be defined as the same.

A square block can be defined as the set of points (u, v) satisfying the condition:

$$SB = \left\{ (u, v) \mid u_0 - \frac{N}{2} < u \le u_0 + \frac{N}{2}, v_0 - \frac{N}{2} < v \le v_0 + \frac{N}{2} \right\}$$

where $(u_0, v_0)$ and N are, respectively, the center and the size of the edges of the block SB.

The aforementioned size of the cubic blocks can also be not fixed initially. In such a case, the size can be automatically determined by a Rate Distortion (RD) optimization algorithm, where the Rate corresponds to the amount of information (e.g., in bits) needed to represent the compressed colors of the 3D surface, and where the Distortion is the difference, in terms of quality, between the color of the original surface and the reconstructed color obtained after the decompression process.

In accordance with the systems and methods discussed herein, the mapping process can be divided into three major steps:
1. orthogonal projection of the cubic blocks;
2. filling of the previously projected blocks; and
3. grouping together the projected square blocks (e.g., using a space partitioning tree technique).

The first major step is orthogonal projection. When the surface $\mathcal{S}$ intersects a cubic block, the portion $\mathcal{S}_{CB^k}$ of the surface $\mathcal{S}$, included in the kth cubic block CB, is defined as the set of points satisfying the condition:

$$S_{CB} = \left\{ (x, y, z) \subset S \mid x_0 - \frac{N}{2} < x \le x_0 + \frac{N}{2}, \right.$$
$$\left. y_0 - \frac{N}{2} < y \le y_0 + \frac{N}{2}, z_0 - \frac{N}{2} < z \le z_0 + \frac{N}{2} \right\}$$

where $(x_0, y_0, z_0)$ and N are, respectively, the center and size of the edges of the block CB. To simplify the notation hereinafter, the set of points satisfying the above condition can be expressed as $\mathcal{S}_{CB} = \{(x, y, z)\}$.

An orthogonal projection is applied to the portion of surface $\mathcal{S}_{CB}$. The surface included in a cubic block is transformed into three different 2D square areas. Each of them includes an orthogonal projection aligned to a different one of the three axes of a Cartesian coordinate system: x-axis, y-axis and z-axis.

The orthogonal projection aligned along the x-axis implies that the x component is set equal to 0:

$$P_{x=0} = (x, y, z) \rightarrow (0, y, z)$$

The same condition, applied to the other components, is valid for the two orthogonal projections obtained along the y-axis and z-axis:

$$P_{y=0} = (x, y, z) \rightarrow (x, 0, z)$$

$$P_{z=0} = (x, y, z) \rightarrow (x, y, 0)$$

The application of each orthogonal projection, to convert a cubic block into a square block, can thus be defined as:

$$SB_x = P_{x=0} \mathcal{S}_{CB}$$

$$SB_y = P_{y=0} \mathcal{S}_{CB}$$

$$SB_z = P_{z=0} \mathcal{S}_{CB}$$

Figure 7:
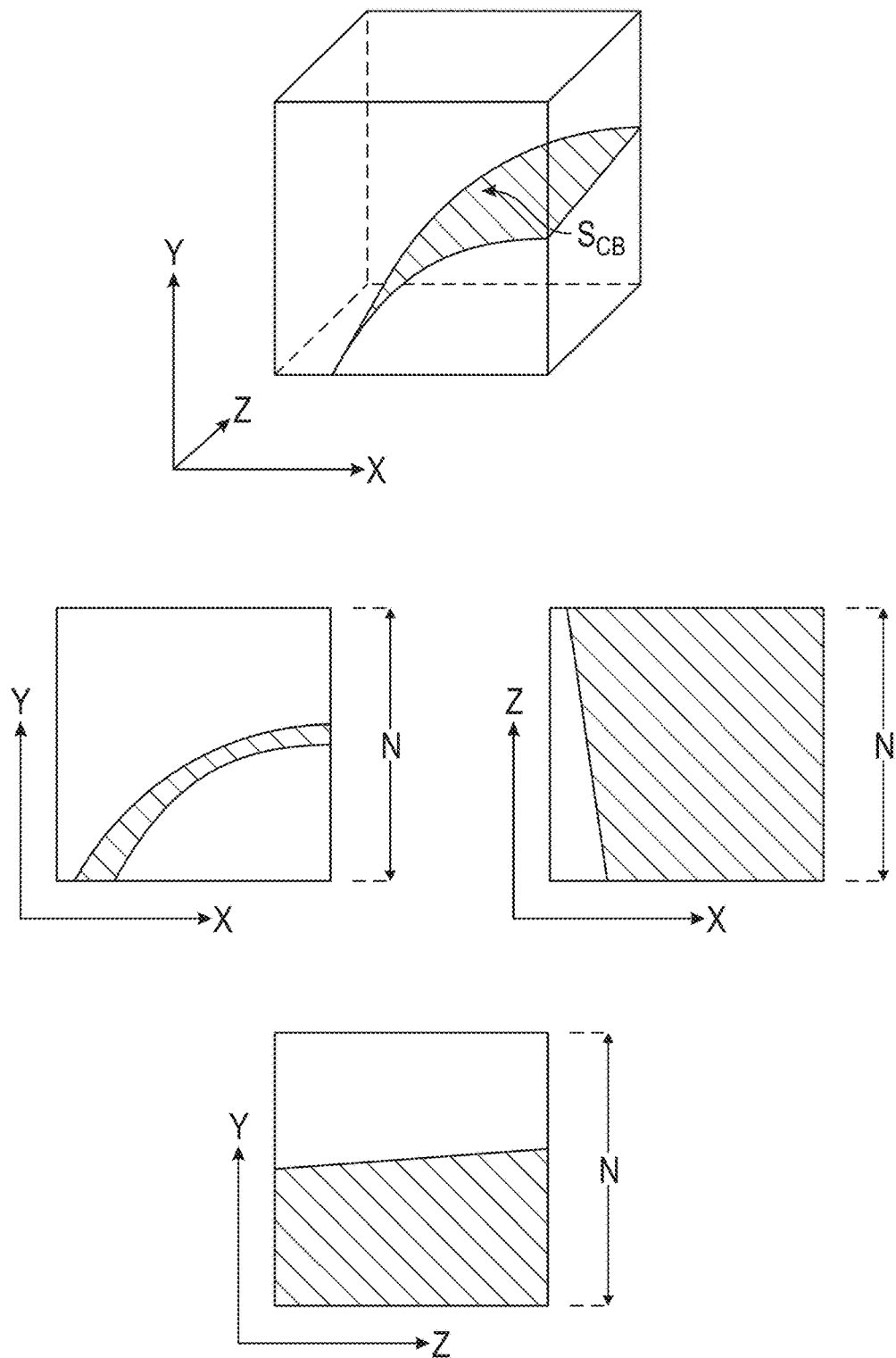
FIG. 7 is a conceptual diagram illustrating three orthogonal projections, according to some example embodiments.

FIG. 7 is a conceptual diagram illustrating these three orthogonal projections, according to some example embodiments.

To simplify the application of the three orthogonal projections to $\mathcal{S}_{CB}$, the coordinate system of the surface $\mathcal{S}$ is first shifted to origin of the cube CB. The center of the cube is then defined as:

$$(x_0, y_0, z_0) \rightarrow (N/2, N/2, N/2)$$

The shifted portion of surface $\mathcal{S}_{CB}$ is then called $\mathcal{S}_{CB}^T$ and defined as:

$$S_{CB}^{(T)} = \left\{ (x, y, z) \mid \left\{ x + \left(x_0 - \frac{N}{2}\right), y + \left(y_0 - \frac{N}{2}\right), z + \left(z_0 - \frac{N}{2}\right) \right\} \in S_{CB} \right\}$$

The corresponding projected square block is then defined as:

$$SB^{(T)} = \{(u, v) \mid 0 < u \le N, 0 < v \le N\}$$

When projecting along the x-axis, the x component is set equal to 0. The points of $\mathcal{S}_{CB}^{(T)}$ projected along the x-axis will then occupy the positions defined as:

$$(u, v) \in SB_x^{(T)} = P_{x=0} \mathcal{S}_{CB}$$

In a similar way, projecting along the y-axis and z-axis, the projected points will occupy, respectively, the positions defined as:

$$(u,v) \in SB_y^{(T)} = P_{y=0} S_{CB}$$

$$(u,v) \in SB_z^{(T)} = P_{z=0} S_{CB}$$

Figure 8:
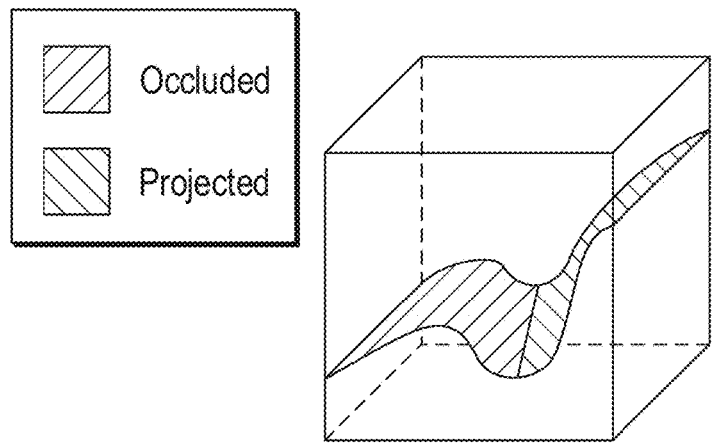
FIG. 8 is a conceptual diagram illustrating occlusion of points, according to some example embodiments.
Figure 8:
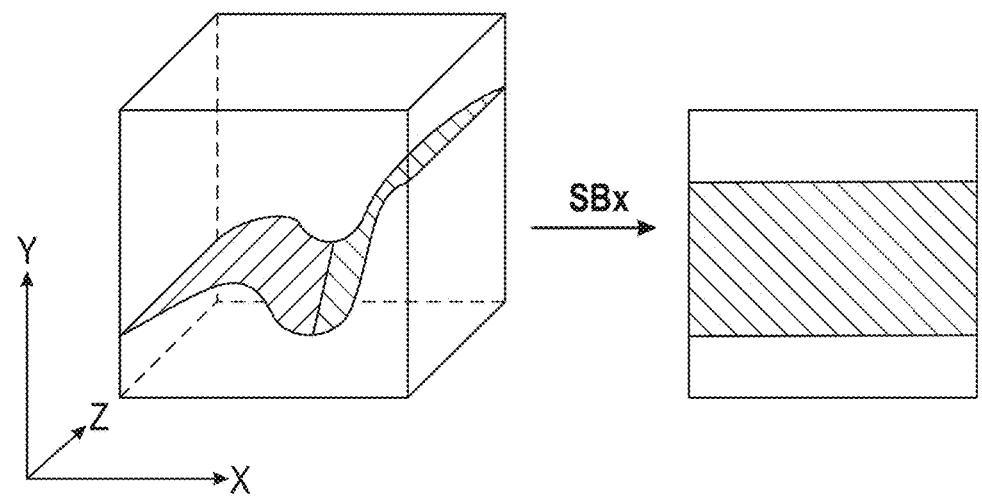

Once the three orthogonal projections are evaluated, only one is selected to be the mapping, in the 2D space, of the cubic block. The selected orthogonal projection is the one that corresponds to the projection aligned to the axis parallel to the dominant direction. When projecting a surface into a 2D space, a certain portion of surface can be occluded. As used herein, a 3D point in the cubic block is said to be "occluded" if there is another 3D point in the cubic block projecting to the same 2D point in the square block. The projection onto the square block of the 3D points in the cubic block that is occluded is called the occluded area. FIG. 8 is a conceptual diagram illustrating occlusion of points, according to some example embodiments.

The dominant direction may be determined by various methods in various example embodiments of the systems and methods discussed herein. In one method, the dominant direction is the one that projects into a square block the surface included in a cubic block, minimizing the occluded area. In another method, the dominant direction is the one most closely aligned to the surface normal. In another method, the dominant direction is the one most closely aligned to the minor axis of an ellipsoid fit to the set of points in the cubic block. Various other methods are also possible.

In some example embodiments of the systems and methods discussed herein, the dominant direction is determined by minimizing the occluded area. For example, minimizing the occluded area can be performed by maximizing the projected area. When the projections used are the three previously defined, such maximization can be done among the three sets of points defined by $SB_x^{(T)}$, $SB_y^{(T)}$ and $SB_z^{(T)}$. Transformations or other kinds of projections may be used, according to various example embodiments. In such cases, the maximization may be performed over different sets of points. Accordingly, for purposes of minimizing the occluded area, the dominant direction D may be the one corresponding to the projection P that maximizes the area of the projected surface:

$$SB_D^{(T)} = \text{argmax}\{\int_{SB^{(T)}} du\, dv | SB^{(T)} \in \{SB_x^{(T)}, SB_y^{(T)}, SB_z^{(T)}\}\}$$

Once the dominant direction is found, a 2D representation of the color information can be assigned to the 2D square block. According to various example embodiments of the systems and methods discussed herein, such color information is obtained by choosing among two options:
1. the color values of the 2D square block can be assigned by averaging the color values of the 3D points, of the surface, aligned along the dominant direction; or
2. to reduce complexity, the color values of the 2D square block can be assigned by copying the color values of the first 3D points, of the surface, aligned along the dominant direction, excluding the colors of the occluded 3D points.

Figure 9:
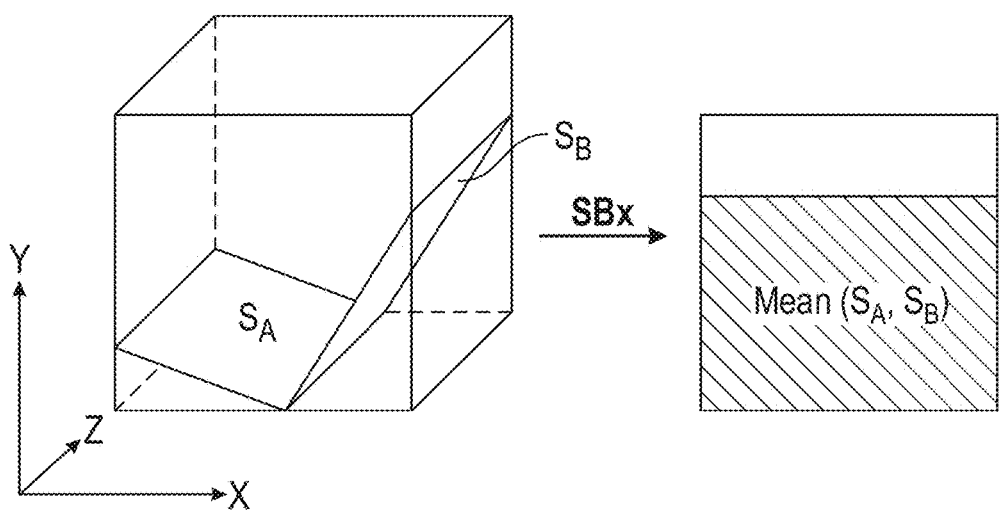
FIG. 9 is a conceptual diagram illustrating assignment of averaged color values, according to some example embodiments.
Figure 10:
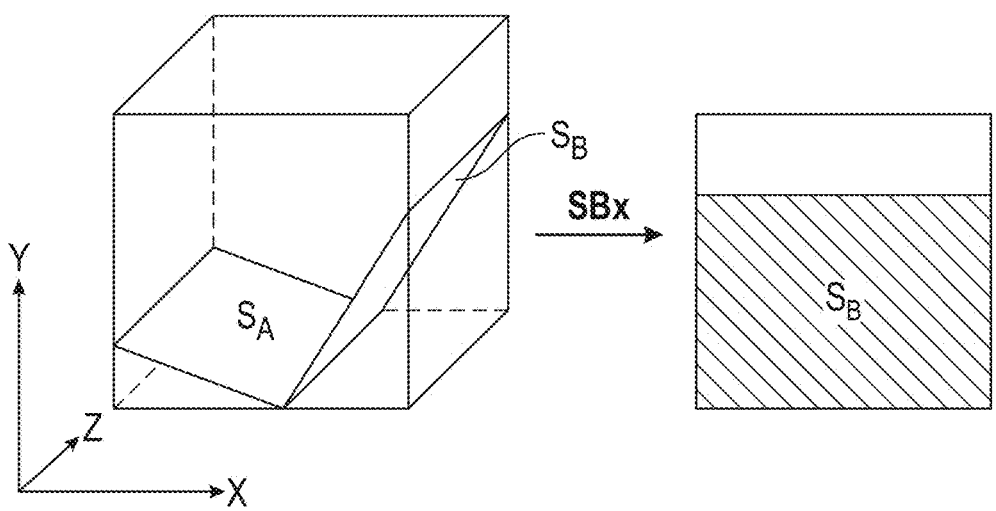
FIG. 10 is a conceptual diagram illustrating assignment of copied color values, according to some example embodiments.

FIG. 9 is a conceptual diagram illustrating an example assignment of averaged color values (the first option), while FIG. 10 is a conceptual diagram illustrating an example assignment of copied color values (the second option). Any of various kinds of interpolation techniques can be used to represent the color information of the projected surface.

Figure 11:
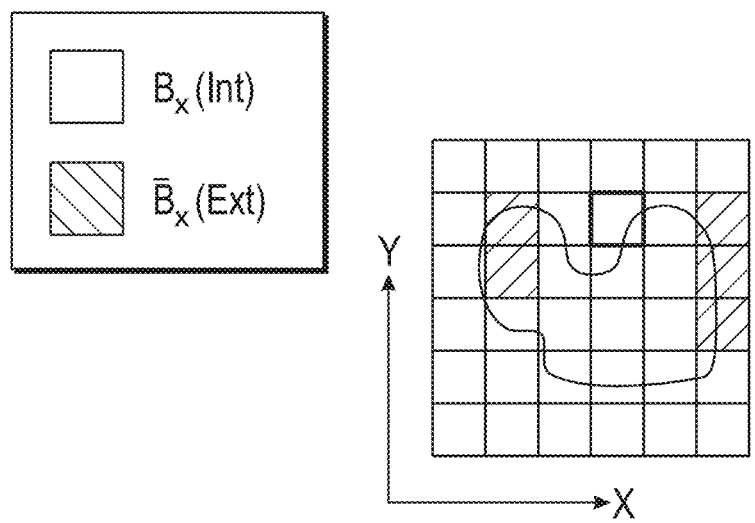
FIG. 11 is a conceptual diagram illustrating block-wise occlusion and a most external block, according to some example embodiments.

At this stage, the systems and methods discussed herein have obtained a 2D projected version of each cubic block of the surface. It can be helpful to consider a generic cubic block CB, with center position $c=(x_0, y_0, z_0)$ and dominant direction D, and also having a corresponding generic square block $SB \in \mathbb{R}^2$:

Next, the systems and methods discussed herein identify only those projections that correspond to the cubic blocks respecting the condition of being the most external layer of the surface $S$. As used herein, the phrase "most external layer" refers to those blocks that, when observed from the dominant direction, are not occluded by any other block. FIG. 11 is a conceptual diagram illustrating block-wise occlusion and a most external block, according to some example embodiments.

To define the most external blocks, it can be helpful to use the notation $CB_{ext}$. To define the blocks belonging to the set $CB_{ext}$, the set B is defined as including all of the cubic blocks, divided within three sets of blocks depending on the dominant direction $B_x$, $B_y$, $B_z$. The conditions for a block to belong to the set $CB_{ext}$ are given by:

$$\tilde{B}_x \subset B_x : \tilde{B}_x = \{B_i : x_i = \min_j x_j \lor x_i = \max_j x_j\}$$

$$\tilde{B}_y \subset B_y : \tilde{B}_y = \{B_i : y_i = \min_j y_j \lor y_i = \max_j x_j\}$$

$$\tilde{B}_z \subset B_z : \tilde{B}_z = \{B_i : z_i = \min_j z_j \lor z_i = \max_j x_j\}$$

All of these sets $\tilde{B}$ thus belong to $CB_{ext}$:

$$B_{ext} = \tilde{B}_x \cup \tilde{B}_y \cup \tilde{B}_z$$

Each set $\tilde{B}$ can be divided into two sets $\tilde{B}_-$ and $\tilde{B}_+$, where:

$$\tilde{B}_{x-} \subset \tilde{B}_x : \tilde{B}_{x-} = \{\tilde{B}_i : x_i = \min_j x_j\}; \tilde{B}_{x+} \subset \tilde{B}_x : \tilde{B}_{x+} = \{\tilde{B}x_i = \max_j x_j\}$$

$$\tilde{B}_{y-} \subset \tilde{B}_y : \tilde{B}_{y-} = \{\tilde{B}_i : y_i = \min_j y_j\}; \tilde{B}_{y+} \subset \tilde{B}_y : \tilde{B}_{y+} = \{\tilde{B}y_i = \max_j y_j\}$$

$$\tilde{B}_{z-} \subset \tilde{B}_z : \tilde{B}_{z-} = \{\tilde{B}_i : z_i = \min_j z_j\}; \tilde{B}_{z+} \subset \tilde{B}_z : \tilde{B}_{z+} = \{\tilde{B}z_i = \max_j z_j\}$$

The 2D projections SB corresponding to the cubic blocks, belonging to each of the 6 sets explained above, are grouped together into 6 sets of square blocks grouped separately.

$$G_{x-}, G_{x+}, G_{y-}, G_{y+}, G_{z-}, G_{z+}$$

The generic set is accordingly called G.

Figure 12:
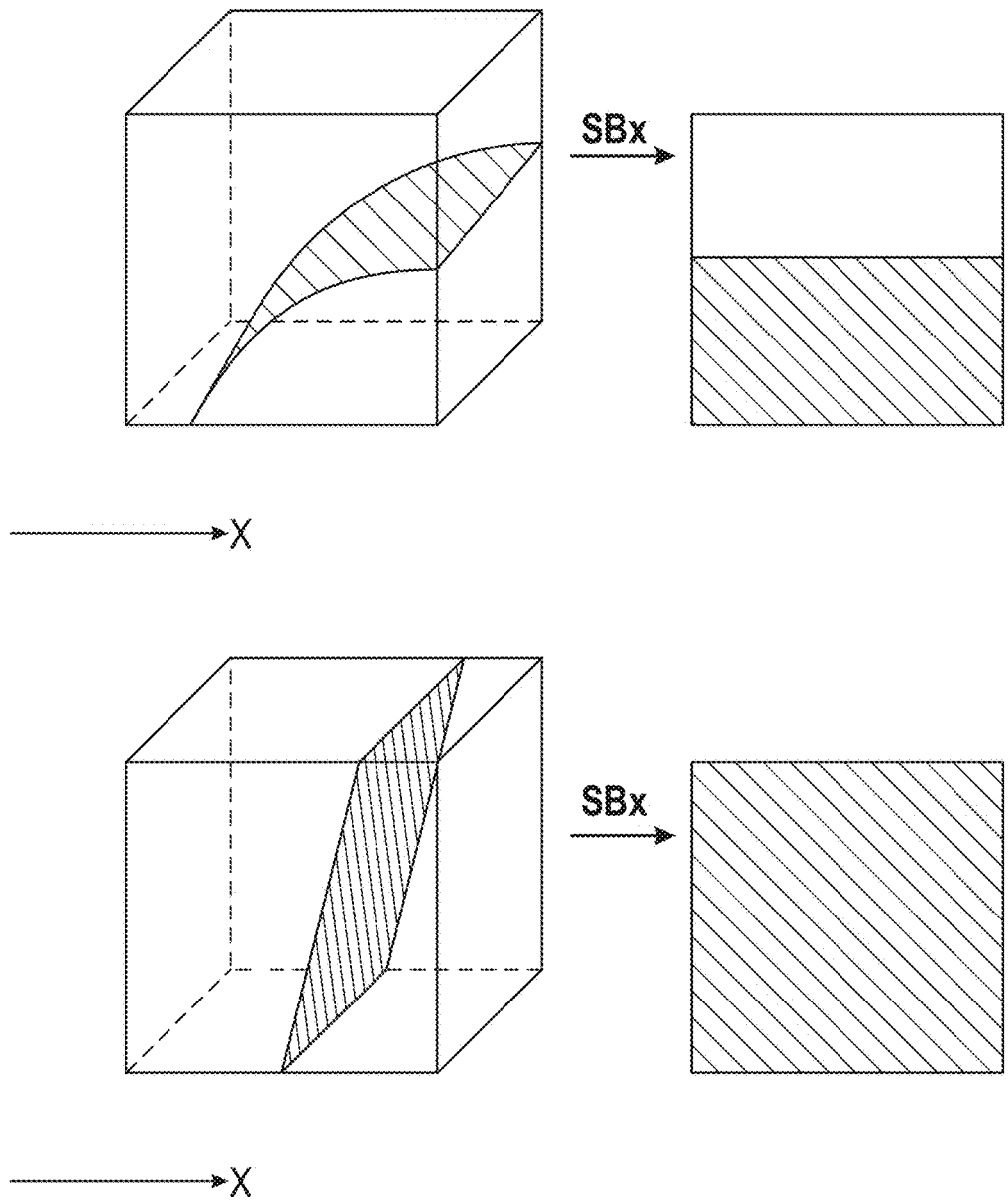
FIG. 12 is a conceptual diagram illustrating a fully occupied cubic block and a partially occupied cubic block, according to some example embodiments.

The second major step of the mapping process is filling the previously projected blocks. The previous projection produced 6 sets of square blocks, which are 2D sparse matrices. The sparse nature of each block SB is due to the fact that a cubic block CB may not be fully occupied when projected along its dominant direction. FIG. 12 is a conceptual diagram illustrating a fully occupied cubic block and a partially occupied cubic block, according to some example embodiments. The presence of the empty spaces will likely cause a reduction of compression efficiency when the UV map is compressed by a video encoder. Therefore, in order to reduce the impact of the empty areas, a step called filling is performed.

The filling can be performed by grouping together the 2D projections, each already grouped into one of the sets G, with the projections of other cubic blocks belonging to $B_{int}$. For a generic block $CB_{ext} \subset B_{ext}$, the considered blocks of the set $CB_{int} \subset B_{int}$ are the ones which meet the following two conditions:
1. If the block $CB_{int}$ is adjacent to the block $CB_{ext}$, there exists a point of intersection between the surface $S$ and the boundary between $CB_{ext}$ and $CB_{int}$. Otherwise, if the block $CB_{int}$ is not adjacent to the block $CB_{ext}$, there exists a point of intersection between the surface $S$ and the boundary between $CB_{int}$ and the blocks, belonging to $B_{int}$, that fulfill the previous statement.

2. With respect to the dominant direction D of the block $CB_{ext}$, the values of the coordinates ($x_0$, $y_0$, $z_0$) of the center of $CB_{int}$ that are different than the value corresponding to D, are equal to each other. For example, if D corresponds to the projection $P_{x=0}$, the values used are the ones for $y_0$, $z_0$. In such a case, in order to verify the condition, this condition becomes:

$$y_{ext,0}=y_{int,0} \wedge z_{ext,0}=z_{int,0}$$

Figure 13:
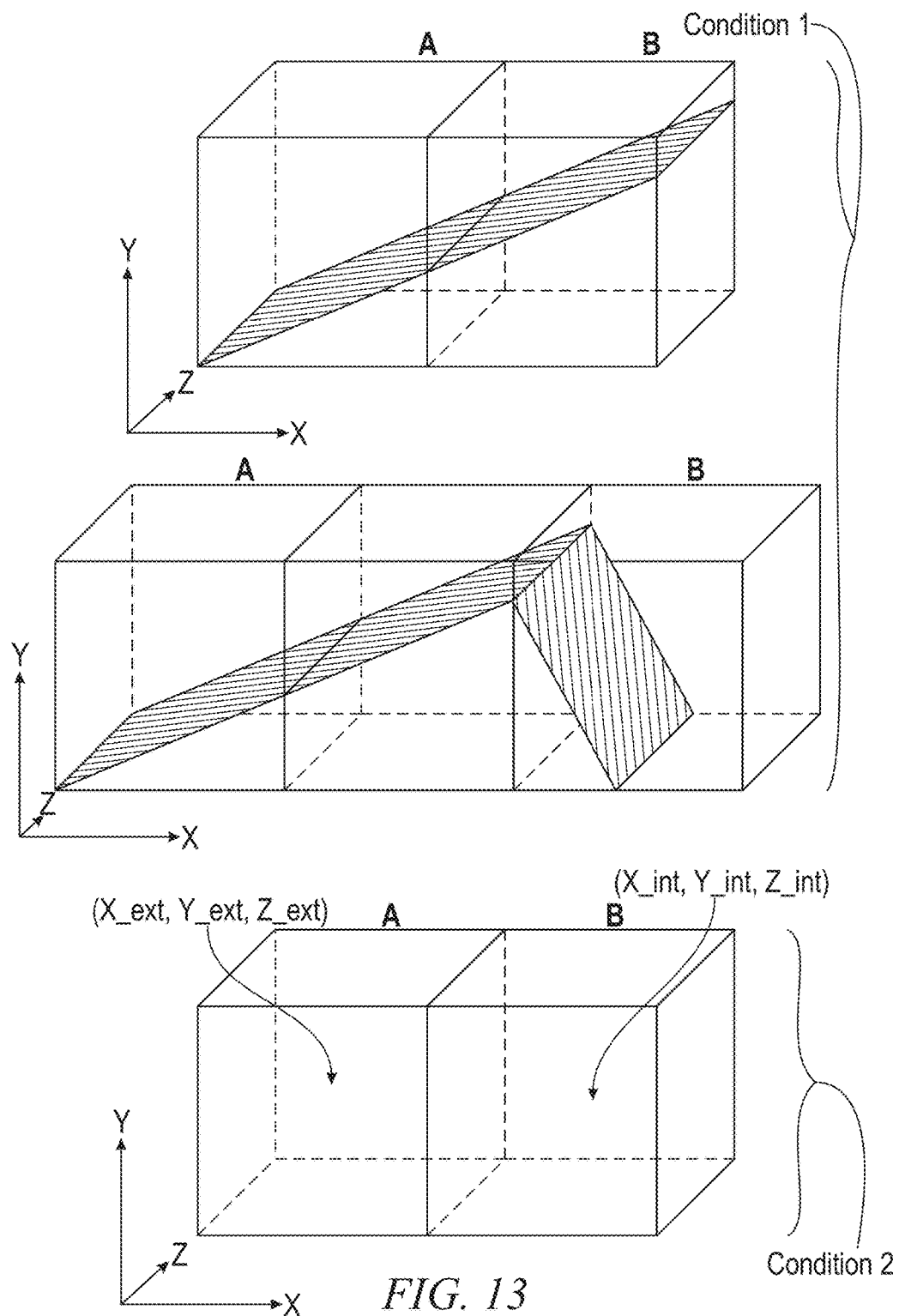
FIG. 13 is a conceptual diagram illustrating blocks with a common dominant direction and aligned block centers, according to some example embodiments.

FIG. 13 is a conceptual diagram illustrating blocks with a common dominant direction and aligned block centers, according to some example embodiments.

In FIG. 13, the uppermost diagram illustrates adjacent two blocks, denoted "A" and "B," which have a common boundary that intersects the surface $S$. In the middle diagram within FIG. 13, the two blocks denoted "A" and "B" are not adjacent, but there is an intersection between the surface $S$ and a common boundary between block "B" and another (e.g., intervening) block that fulfills the same condition shown in the uppermost diagram in FIG. 13. The uppermost diagram and the middle diagram in FIG. 13 therefore illustrate examples of the first condition discussed above. In contrast, the bottommost diagram within FIG. 13 illustrates an example of the second condition discussed above. In the bottommost diagram of FIG. 13, X is the dominant direction; Y_ext is equal to Y_int; and Z_ext is equal to Z_int.

The filling operation can be implemented in at least the following two different ways, depending on whether the pixels of the 2D square block, projected in the orthogonal projection operation, were already occupied (e.g., indicating presence of occlusions) or not (e.g., corresponding to an empty area of the projected cubic block).

When one of the most external cubic blocks is projected to a 2D square block, there may be an empty area along the dominant direction which remains empty in the square block. When the 2D image, containing the square blocks, is compressed, empty areas will likely produce high frequency content which is not handled by the video encoder as well as the low frequency content. The filling step reduces the amount of high frequency content by filling these empty areas.

Figure 14:
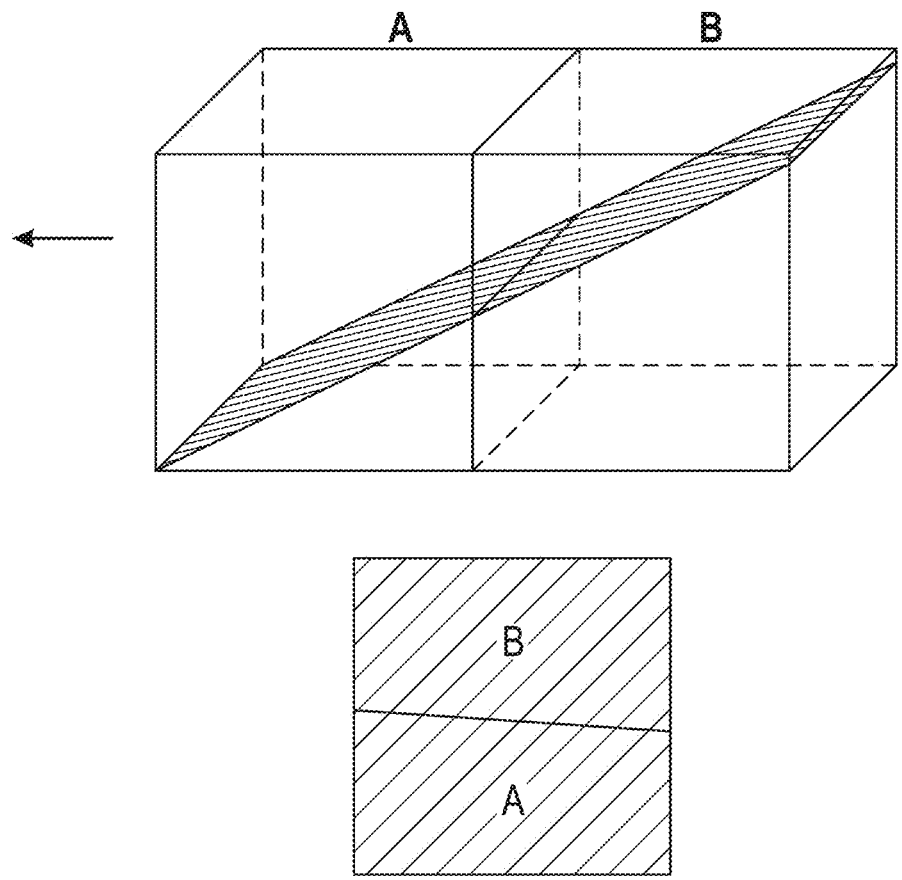
FIG. 14 is a conceptual diagram illustrating the filling of adjacent cubic blocks, according to some example embodiments.

In some situations, cubic blocks are adjacent. Suppose that both the generic block $CB_{ext}$ and the adjacent block $CB_{int}$ meet the two aforementioned conditions. The portion of surface $S$ included in $CB_{int}$ is not fully occluded by the portion of $S$, included in $CB_{int}$, along the dominant direction D. In this case, the two portions of the surface, included in $CB_{ext}$ and $CB_{int}$, are projected together along the dominant direction D, to the same 2D square block SB. FIG. 14 is a conceptual diagram illustrating the filling of adjacent cubic blocks, according to some example embodiments.

Figure 15:
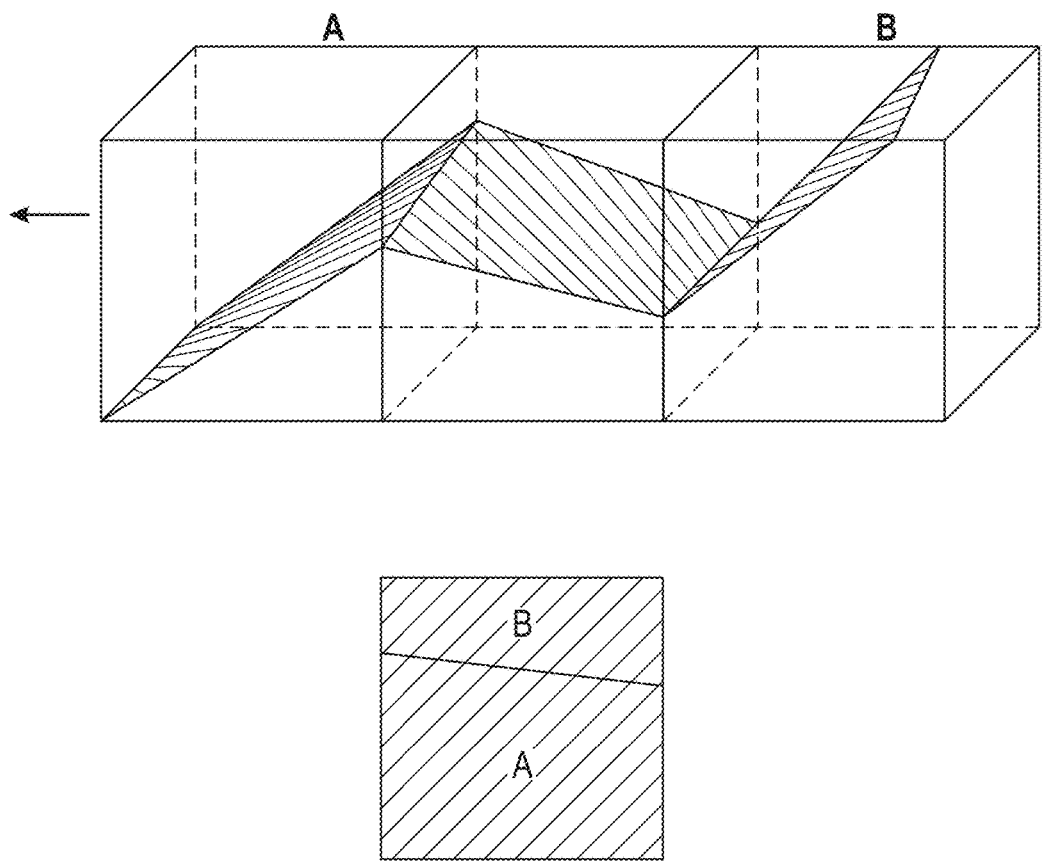
FIG. 15 is a conceptual diagram illustrating the filling of non-adjacent cubic blocks, according to some example embodiments.

In other situations, cubic blocks are non-adjacent. Suppose that both the generic block $CB_{ext}$ and the adjacent block $CB_{int}$ meet the second of the two aforementioned conditions. The portion of surface $S$ included in $CB_{int}$ is not fully occluded by the portion of $S$ included in $CB_{ext}$ along the dominant direction D. The cubic block called $CB_{int}$ does not meet the either of the two aforementioned conditions with any other block, different from $CB_{ext}$, along the other two directions different than D. In this case, the two portions of the surface that are included in $CB_{ext}$ and $CB_{int}$ are projected together along the dominant direction D to the same 2D square block SB. FIG. 15 is a conceptual diagram illustrating the filling of non-adjacent cubic blocks, according to some example embodiments.

Figure 16:
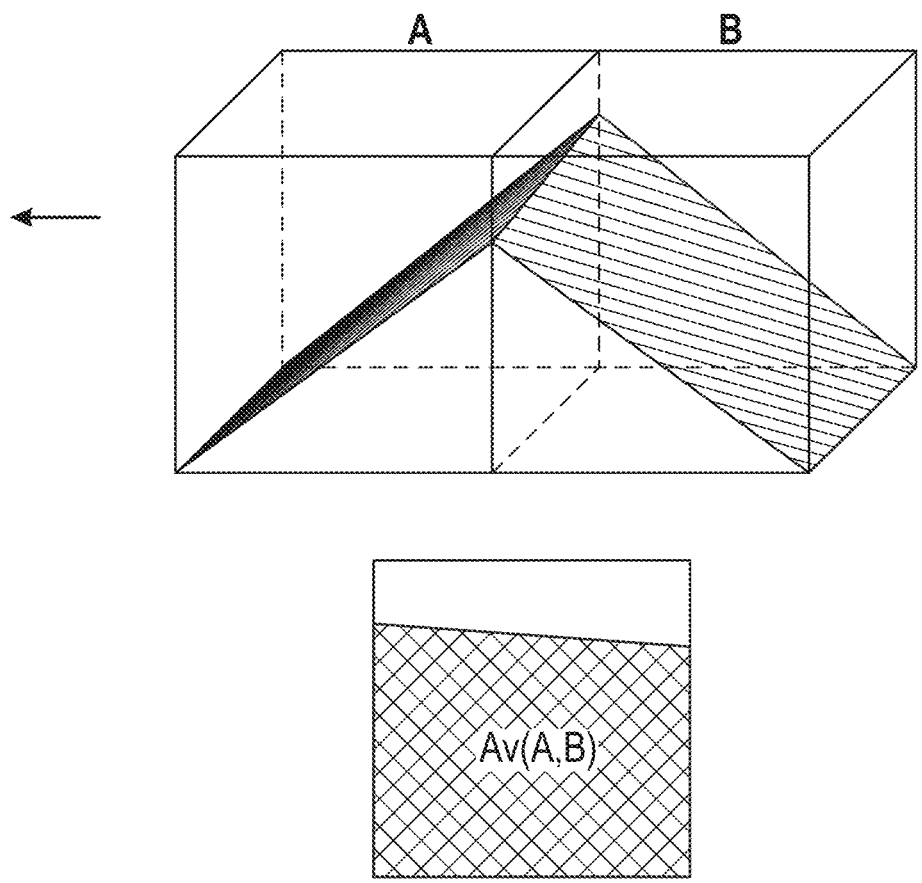
FIG. 16 is a conceptual diagram illustrating the filling of occluded cubic blocks with averaged color values, according to some example embodiments.

Occlusion may be present in certain situations (e.g., involving adjacent cubic blocks). Suppose that both the generic block $CB_{ext}$ and the adjacent block $CB_{int}$ meet the two aforementioned conditions, but the portion of surface $S$ included in $CB_{int}$ is fully or partially occluded by the portion of S that is included in $CB_{ext}$ along the dominant direction D. In this case, the two portions of the surface that are included in $CB_{ext}$ and $CB_{int}$ are projected together along the dominant direction D to the same 2D square block SB. The color values of SB are assigned by averaging the color values of the 3D surface aligned along the dominant direction D. FIG. 16 is a conceptual diagram illustrating the filling of occluded cubic blocks with such average color values, according to some example embodiments.

At this stage, the systems and methods discussed herein have obtained 6 sets of square blocks, including the color information of the most external projected blocks $B_{ext}$, plus performed the above-described filling step based on the color information of some of the non-external blocks that meet the aforementioned conditions.

The portion of the 3D surface not projected so far is stored and processed again in a loop. For each loop iteration, 6 different sets of square blocks are generated in accordance with the systems and methods discussed herein. The loop ends when a certain percentage of the 3D surface is projected. The remaining part of the surface may then be handled independently, after the third major step in the mapping process, which involves grouping together the projected square blocks (e.g., using a space partitioning tree). Before the third major step, the sets are reorganized into 2D matrices. To facilitate this reorganization, it can be helpful to shift from the continuous space to the discrete space: $\mathbb{R} \rightarrow \mathbb{Z}$.

Recalling the generic set G discussed above, the block SB is a 2D sparse matrix where the positions of the non-zero values are defined by the list of coordinates (u, v), as previously defined. The values (u, v) are valid when the surface $S$ is shifted to the center of the cube CB. When shifting the system back as the original surface S, the list of coordinates of SB can be defined as (u', v').

Among the set G, the values (u', v') of each square block SB are unique. In view of this uniqueness, the coordinates of all blocks in the set can be grouped together:

$$g=(u',v')$$

To each couple of values of the list g there will be a vector, with size [1, 3], containing the color information of the surface $S$ at the position (x, y, z) projected to each 2D point (e.g., by projecting, filling, averaging, or any suitable combination thereof, as described above). For commodity, the list of colors that correspond to g is called:

$$C=(r,g,b)$$

The color vector at a generic position c of the list C corresponds to the couple of coordinates g(c).

The uniqueness of each square block enables reorganization of each square block into a matrix M. In the matrix, the positions of the values are defined by the color list corresponding to g. The matrix M has dimensions (I, J) that equal the maximum values of the two coordinates different from the ones corresponding to the dominant direction D.

Accordingly, matrices $M_{x-}$ and $M_{x+}$ have dimensions (I, J)=($y_{max}$, $z_{max}$). Following a similar process, the dimensions of matrices $M_{y-}$ and $M_{y+}$ are ($x_{max}$, $z_{max}$), and the dimensions of matrices $M_{z-}$ and $M_{z+}$ are ($x_{max}$, $y_{max}$).

The values included in each matrix are 0 when no 3D point is projected, and a vector that includes the color of the projected surface point, when there is a projected 3D point. This may be expressed as:

$$M = \begin{bmatrix} v_{1,1} & \cdots & v_{0,J} \\ \vdots & \ddots & \vdots \\ v_{I,0} & \cdots & v_{I,J} \end{bmatrix}; v_{i,j} = \begin{cases} C(c) & \text{if } (i,j) \in g \wedge g(c) = (i,j) \\ 0 & \text{otherwise} \end{cases}$$

The third major step in the mapping process is grouping together the projected square blocks (e.g., using a space partitioning tree). This may be performed by processing the six matrices generated in each iteration of the projection and filling stages, in order to generate the UV map. In particular, the six matrices may be processed using a space partitioning tree.

Figure 17:
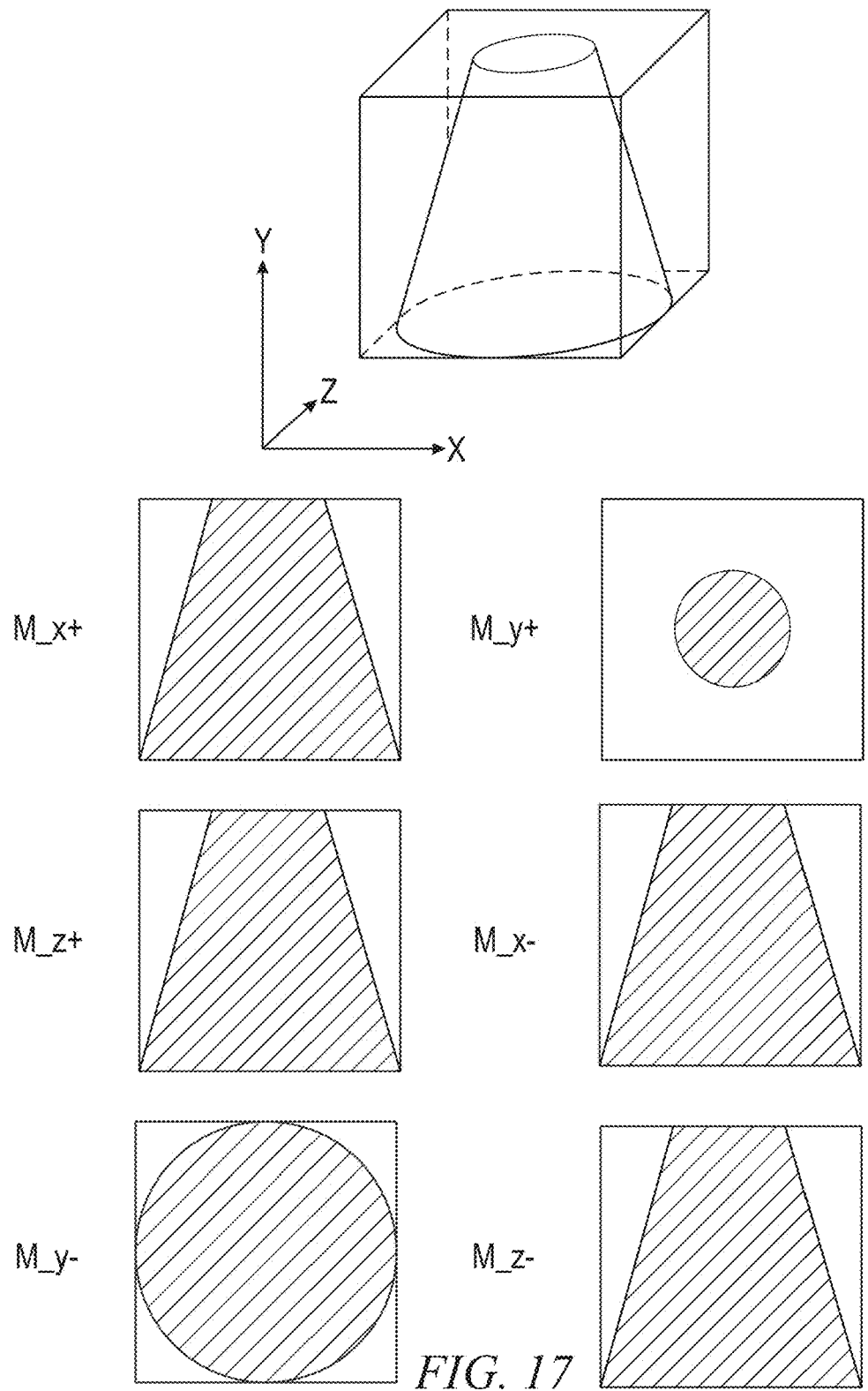
FIG. 17 is a conceptual diagram illustrating a sextet of projected images, according to some example embodiments.

FIG. 17 is a conceptual diagram illustrating a sextet of projected images, according to some example embodiments. A space partitioning tree can be applied independently on each matrix previously created. As a threshold matter, each matrix may be initially resized. This may be performed for either or both of at least two reasons:
1. to facilitate the space partition tree, the sizes should be equal to $2^n$, n=1, 2 ... N; or
2. to minimize the 2D areas corresponding to empty 3D space.

For each matrix, the new size may be the minimum size that still includes all of the non-zero values of the matrix.

Accordingly, the minimum indices pointing to a non-zero value can be expressed as:

$i_{min} = \min_i (v_{i,j} \neq 0)$ $j_{min} = \min_j (v_{i,j} \neq 0)$

The resized matrix $\hat{M}$ thus has the size:

$\hat{I} = (I - i_{min}) + [2^{n_i} - ((I - i_{min}))]$ $\hat{J} = (J - j_{min}) + [2^{n_j} - ((J - j_{min}))]$ where:

$n_i = \min_n 2^n | 2^n > (I - i_{min})$ $n_j = \min_n 2^n | 2^n > (J - j_{min})$ The new matrix can be denoted as $\hat{M}$.

Figure 18:
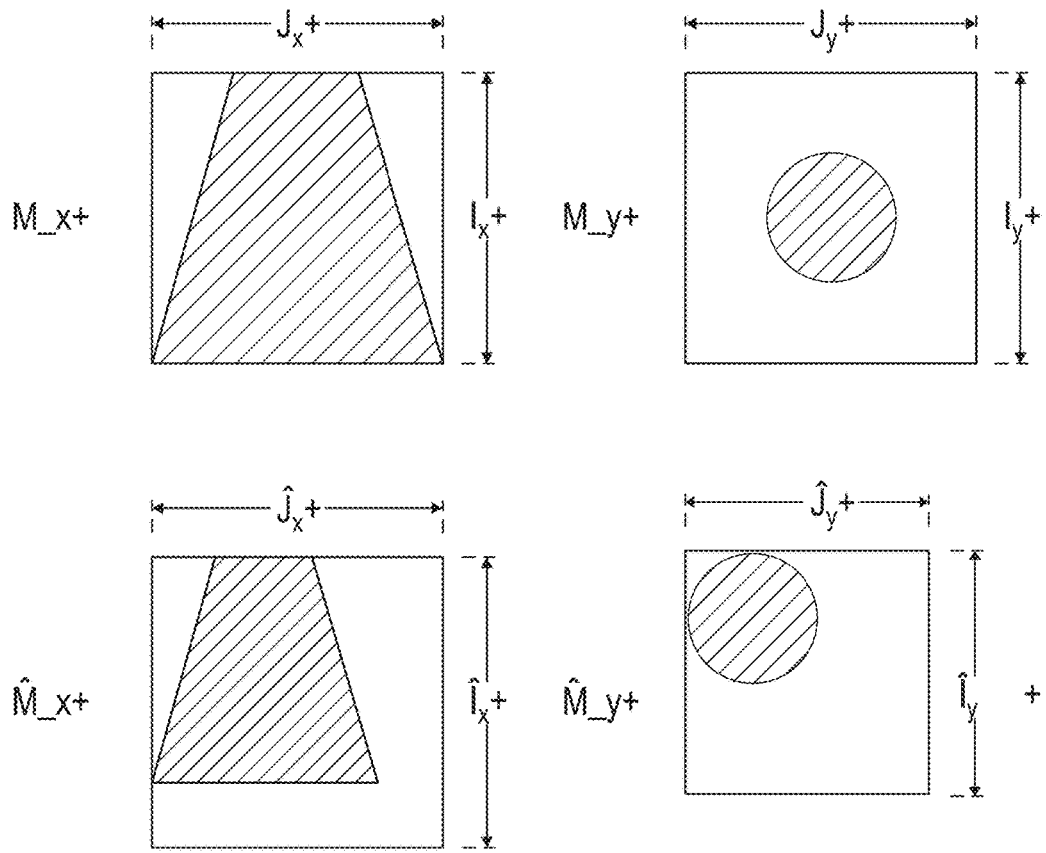
FIG. 18 is a conceptual diagram illustrating a resized image, according to some example embodiments.

FIG. 18 is a conceptual diagram illustrating a resized image, according to some example embodiments. The resized image is processed by a partitioning tree (e.g., a space partitioning tree) that is configured to divide the area into sub-images that each include an amount of projected surface that is higher than a defined occupancy threshold $Th_{occ}$.

In applying the partitioning tree, as a first internal step, the systems and methods discussed herein initially calculate the percentage of projected surface in the whole matrix. This percentage corresponds to the ratio between the number of elements of the resized matrix, with size ($\hat{I}_1, \hat{J}_1$), and the number of non-zero elements therein, which is also the cardinality of the vector C.

$$Occ = \frac{\hat{I}_1 \times \hat{J}_1}{\overline{\overline{C}}}$$

If $c \geq Th_{occ}$, the application of the partitioning tree stops; otherwise, it follows to the second internal step. The image is divided into two sub-images along the longer side of the image, such that the two sub-images will have equal areas and dimensions ($\hat{I}_2, \hat{J}_2$).

$$(\hat{I}_2, \hat{J}_2) = \begin{cases} \left(\frac{\hat{I}_1}{2}, \hat{J}_1\right) & \text{if } I_1 \geq J_1 \\ \left(\hat{I}_1, \frac{\hat{J}_1}{2}\right) & \text{if } I_1 < J_1 \end{cases}$$

Figure 19:
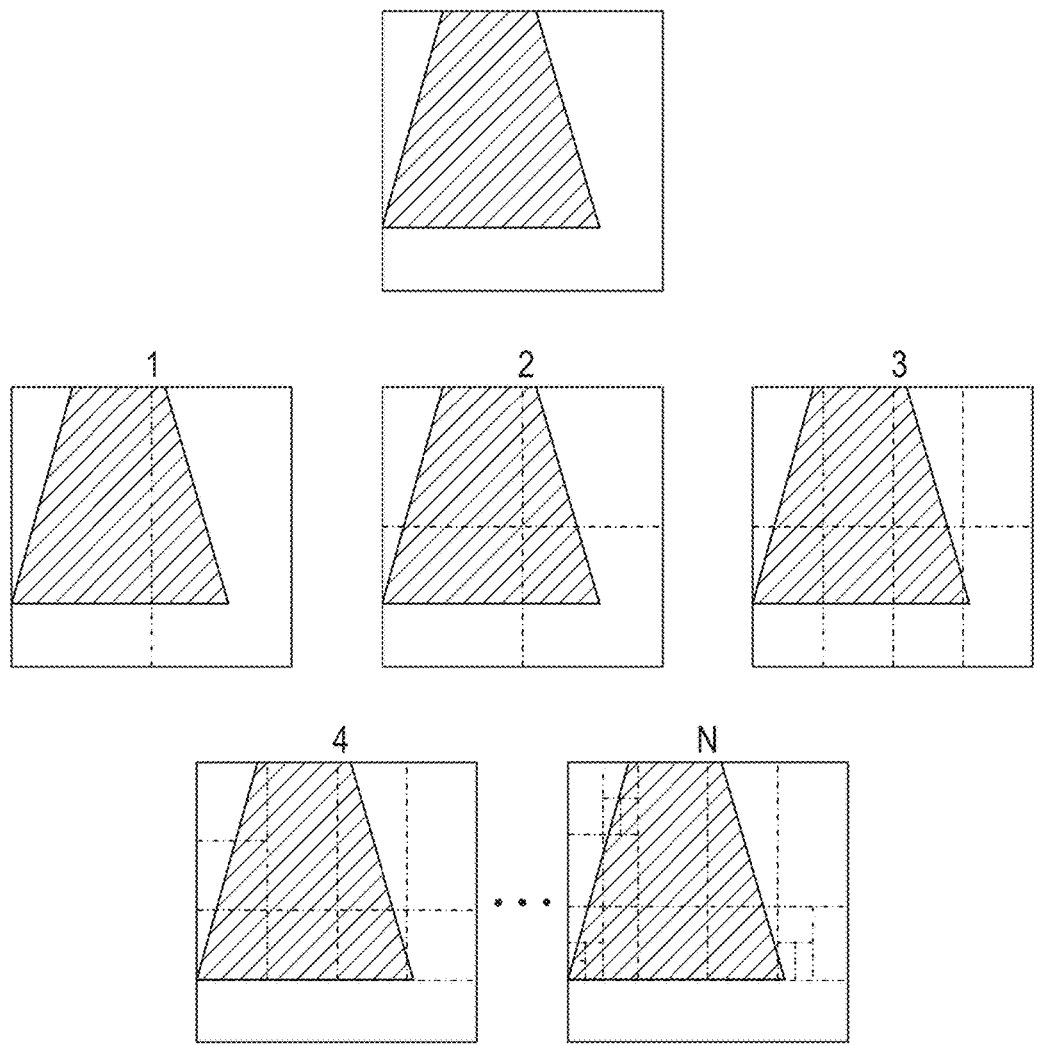
FIG. 19 is a conceptual diagram illustrating image partitioning along the longer side of an image, according to some example embodiments.

FIG. 19 is a conceptual diagram illustrating image partitioning along the longer side of an image, according to some example embodiments.

After the first division, each of two sub-images is analyzed independently, checking again to determine whether the amount of projected surface is higher than the threshold. If the result is negative, the sub-image is once again subdivided but, this time, along the opposite direction.

$$(\hat{I}_3, \hat{J}_3) = \begin{cases} \left(\hat{I}_2, \frac{\hat{J}_1}{2}\right) & \text{if } I_1 \geq J_1 \\ \left(\frac{\hat{I}_1}{2}, \hat{J}_2\right) & \text{if } I_1 < J_1 \end{cases}$$

The sizes of the partitioning at the generic stage may be predefined and may depend on whether the stage number is odd or even.

$$(\hat{I}_{2i}, \hat{J}_{2i}) = \begin{cases} \left(\frac{\hat{I}_{2i-1}}{2}, \hat{J}_{2i-1}\right) & \text{if } I_{2i-1} \geq J_{2i-1} \\ \left(\hat{I}_{2i-1}, \frac{\hat{J}_{2i-1}}{2}\right) & \text{if } I_{2i-1} < J_{2i-1} \end{cases}$$

$$(\hat{I}_{2i+1}, \hat{J}_{2i+1}) = \begin{cases} \left(\hat{I}_{2i}, \frac{\hat{J}_{2i-1}}{2}\right) & \text{if } I_{2i-1} \geq J_{2i-1} \\ \left(\frac{\hat{I}_{2i-1}}{2}, \hat{J}_{2i}\right) & \text{if } I_{2i-1} < J_{2i-1} \end{cases}$$

This process may be reiterated until one of the following 2 conditions holds true:
1. the 3D surface projected to the 2D image occupies more than a certain percentage (e.g., threshold percentage) of the 2D image; or
2. the partitioned area has dimensions equal or less than predefined minimum dimensions (e.g., 8×8 pixels).

When one of the two aforementioned conditions is verified as being true, the sub-image is then stored in the final UV map. The final UV map is a special 2D image that includes all of the sub-images produced by the third major step in the mapping process (e.g., the partitioning tree stage).

According to various example embodiments of the systems and methods discussed herein, the position, in UV coordinates, of each sub-image in the UV map is determined by performing an empty areas minimization step. The goal of the empty areas minimization step is to minimize the amount of mapped atlas corresponding to empty 3D space. When the 2D atlas includes an empty space, a 2D image encoder will likely spend an undesired amount of bits to represent such empty space without a real benefit to the reconstruction of the 3D surface at the decoder side. Thus, by minimizing the empty areas, the amount of undesired bit usage is correspondingly minimized.

The empty area minimization step starts by checking the previously mapped 2D atlas. If there is no other sub-image already mapped, the current, and first, sub-image is mapped in the top left corner of the image. Otherwise, the presence of empty space is calculated.

The empty space, in the UV matrix, contains zero values. These areas can be represented as Z. The top left corner of each Z is described in the coordinates of the matrix UV as $(u_Z, v_Z)$, and the corresponding size of each Z is defined as $(\tilde{I}_Z, \tilde{J}_Z)$.

If there is a 2D area corresponding to empty space, with equal or higher dimensions compared to those of the current sub-image, the top left corner of the sub-image is assigned to the top left corner of the found empty area. If no empty area is found with dimensions greater than or equal to the ones of the sub-image, the 2D atlas is re-sized to fit the information to be mapped.

For the generic sub-matrix $\tilde{M}$ with size $(\tilde{I}, \tilde{J})$, the UV mapping to the UV matrix with size $(u_{UV}, v_{UV})$ can be described as:

$$UV(u_Z:u_Z+\tilde{I}, v_Z:v_Z+\tilde{J}) \text{ if } \forall \{\dot{Z} \subset Z : \tilde{I}_Z > \tilde{I} \wedge \tilde{J}_Z > \tilde{J}\}$$

$$UV(u_{UV}:u_{UV}+\tilde{I}, 0:\tilde{J}) \text{ otherwise}$$

In the latter situation, the matrix UV is then resized to fit the new information.

This space partitioning tree technique is performed until a certain percentage (e.g., threshold percentage) of the surface $S$ is projected. To include, in the UV matrix, the remaining surface, which was already subdivided into cubic blocks, the projection of each CB is handled separately, according to some example embodiments. For example, all of the blocks with size N×N×N may be projected into square blocks SB with size N×N, in accordance with the above-specified equations, where:

$$\tilde{M} = SB$$

$$(\tilde{I}, \tilde{J}) = (N, N)$$

Figure 20:
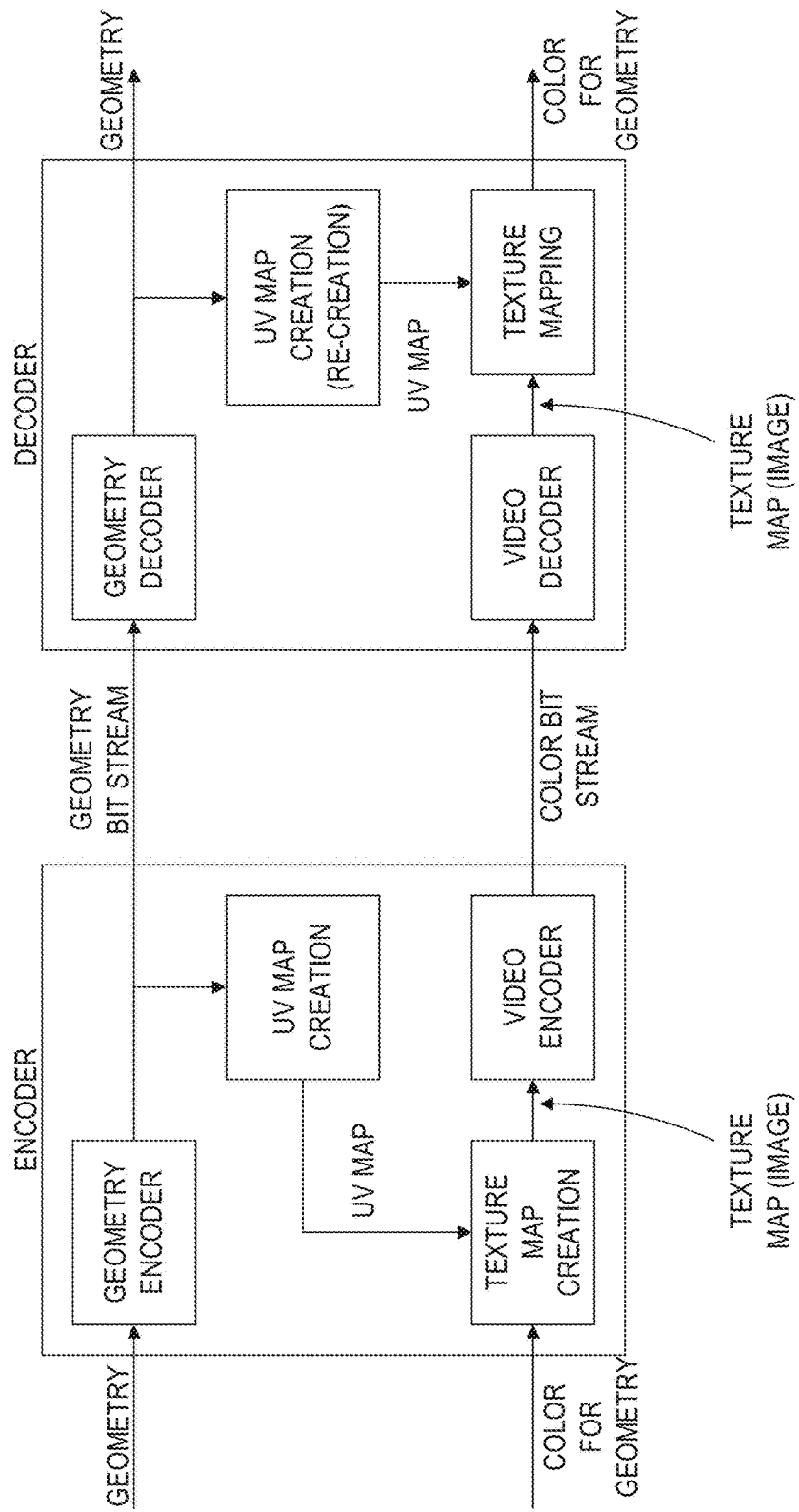
FIG. 20 is a block diagram illustrating operations in the encoding and decoding of an atlas, according to some example embodiments.

Once the atlas, or the atlases in case of dynamic content, are created, the 2D images are compressed by a video-capable encoder that is configured to produce a compressed data stream (e.g., compressed bit-stream) that, when received and decoded by a compatible decoder, enables the decoder to reconstruct a decoded version of the 2D atlas. FIG. 20 is a block diagram illustrating operations in the encoding and decoding of an atlas, according to some example embodiments.

FIG. 20 also shows data flows within an end-to-end system that includes an encoding device (e.g., an encoder) and a decoding device (e.g., a decoder), according to some example embodiments. In solving the technical problem of compression of colored geometry, an end-to-end system may include an encoder and a decoder. The encoder encodes both the geometry data and the color data into a data stream (e.g., a bit stream), and the decoder decodes the encoded geometry data and the encoded color data from the data stream. In some example embodiments, the data stream may be segmented into a geometry bit stream and a color bit stream.

In accordance with certain example embodiments of the systems and methods discussed herein, the methodologies described herein for UV mapping are used for both encoding and decoding colored geometry. In particular, at both the encoder and decoder, certain example embodiments of the systems and methods discussed herein generate a UV map from the geometry data only. That is, in such example embodiments, no color information is used to generate the UV map. Therefore, the UV map can be generated identically at both the encoder and the decoder without sending any information that describes the UV map from the encoder to the decoder. This approach contrasts with other technical solutions for compression of colored geometry that, despite performing UV mapping in ways other than those described herein, nonetheless send at least some information from the encoder to the decoder to describe the UV map. The systems and methods described herein can avoid sending this additional data and are therefore improved over alternative systems and methods by virtue of at least this feature. Thus, according to certain example embodiments of the systems and methods described herein, UV mapping can depend only on geometry data, and such example embodiments can avoid transmitting any parameters of the UV mapping from the encoder to the decoder.

At the decoding side (e.g., decoding device), after the decoded atlas is reconstructed, its colors are assigned to the corresponding 3D surface. The inverse projection of the colors is performed by evaluating the above-described three major steps of the atlas mapping, namely:

1. orthogonal projection of the cubic blocks;
2. filling of the previously projected blocks; and
3. grouping together the projected square blocks (e.g., using a space partitioning tree).

By repeating this process, the systems and methods described herein determine exactly the size of each sub-image (e.g., as evaluated by the partitioning tree technique) and its position in the UV atlas.

The colors are then assigned to the corresponding area of the 3D surface by projecting them according the dominant directions calculated at the decoder side.

If there are occluded areas of the 3D surface, the color information can be assigned in at least the following two example ways:

1. by replicating the same color of the first projected pixel along the dominant direction; or
2. by color interpolation between or among the closest available areas of the surface.

The latter approach provides better quality but requires additional computational resources compared to the former approach.

In some example embodiments of the systems and methods discussed herein, decoding proceeds according to an alternative decoding process that does not require the evaluation of the atlas mapping at the decoder side. Instead, the size and the positions, in both UV coordinates and 3D coordinates of the surface, of each sub-image are transmitted as supplemental information (e.g., side information or other metadata) together with the compressed colors. This alternative method uses an additional amount of data (e.g., additional bits) in the compressed data stream but reduces the computational load on the decoder. Furthermore, to avoid drift between the encoding and the decoding process, when the geometry information of the 3D surface is also compressed, the atlas mapping may be performed on the decoded geometry information.

Figure 21:
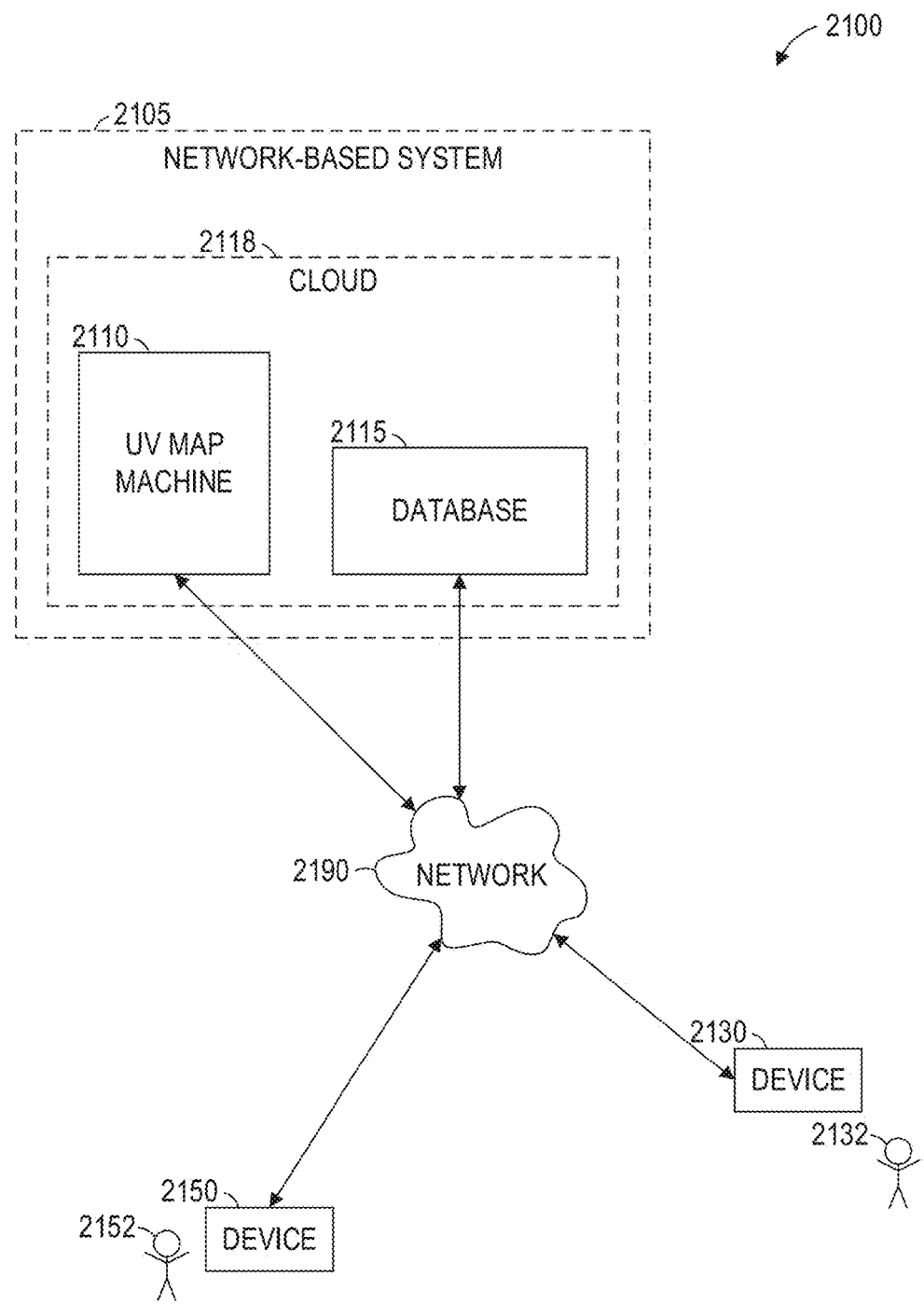
FIG. 21 is a network diagram illustrating a network environment suitable for generating, storing, compressing, decompressing, communicating, or otherwise processing an atlas or portion thereof (e.g., a UV map), according to some example embodiments.

FIG. 21 is a network diagram illustrating a network environment 2100 suitable for generating, storing, compressing, decompressing, communicating, or otherwise processing an atlas or portion thereof (e.g., a UV map), according to some example embodiments. The network environment 2100 includes a UV map machine 2110, a database 2115, and devices 2130 and 2150, all communicatively coupled to each other via a network 2190. The UV map machine 2110, with or without the database 2115, may form all or part of a cloud 2118 (e.g., a geographically distributed set of multiple machines configured to function as a single server), which may form all or part of a network-based system 2105 (e.g., a cloud-based server system configured to provide one or more network-based services to the devices 2130 and 2150). The UV map machine 2110 and the devices 2130 and 2150 may each be implemented in a special-purpose (e.g., specialized) computer system, in whole or in part, as described below with respect to FIG. 26.

Also shown in FIG. 21 are users 2132 and 2152. One or both of the users 2132 and 2152 may be a human user (e.g., a human being), a machine user (e.g., a computer configured by a software program to interact with the device 2130 or 2150), or any suitable combination thereof (e.g., a human assisted by a machine or a machine supervised by a human). The user 2132 is associated with the device 2130 and may be a user of the device 2130. For example, the device 2130 may be a desktop computer, a vehicle computer, a tablet computer, a navigational device, a portable media device, a smart phone, or a wearable device (e.g., a smart watch, smart glasses, smart clothing, or smart jewelry) belonging to the user 2132. Likewise, the user 2152 is associated with the device 2150 and may be a user of the device 2150. As an example, the device 2150 may be a desktop computer, a vehicle computer, a tablet computer, a navigational device, a portable media device, a smart phone, or a wearable device (e.g., a smart watch, smart glasses, smart clothing, or smart jewelry) belonging to the user 2152.

Any of the systems or machines (e.g., databases and devices) shown in FIG. 21 may be, include, or otherwise be implemented in a special-purpose (e.g., specialized or otherwise non-conventional and non-generic) computer that has been modified to perform one or more of the functions described herein for that system or machine (e.g., configured or programmed by special-purpose software, such as one or more software modules of a special-purpose application, operating system, firmware, middleware, or other software program). For example, a special-purpose computer system able to implement any one or more of the methodologies described herein is discussed below with respect to FIG. 26, and such a special-purpose computer may accordingly be a means for performing any one or more of the methodologies discussed herein. Within the technical field of such special-purpose computers, a special-purpose computer that has been specially modified (e.g., configured by special-purpose software) by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the systems or machines illustrated in FIG. 21 may be combined into a single system or machine, and the functions described herein for any single system or machine may be subdivided among multiple systems or machines.

The network 2190 may be any network that enables communication between or among systems, machines, databases, and devices (e.g., between the UV map machine 2110 and the device 2130). Accordingly, the network 2190 may be a wired network, a wireless network (e.g., a mobile or cellular network), or any suitable combination thereof. The network 2190 may include one or more portions that constitute a private network, a public network (e.g., the Internet), or any suitable combination thereof. Accordingly, the network 2190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a WiFi network or WiMax network), or any suitable combination thereof. Any one or more portions of the network 2190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 22:
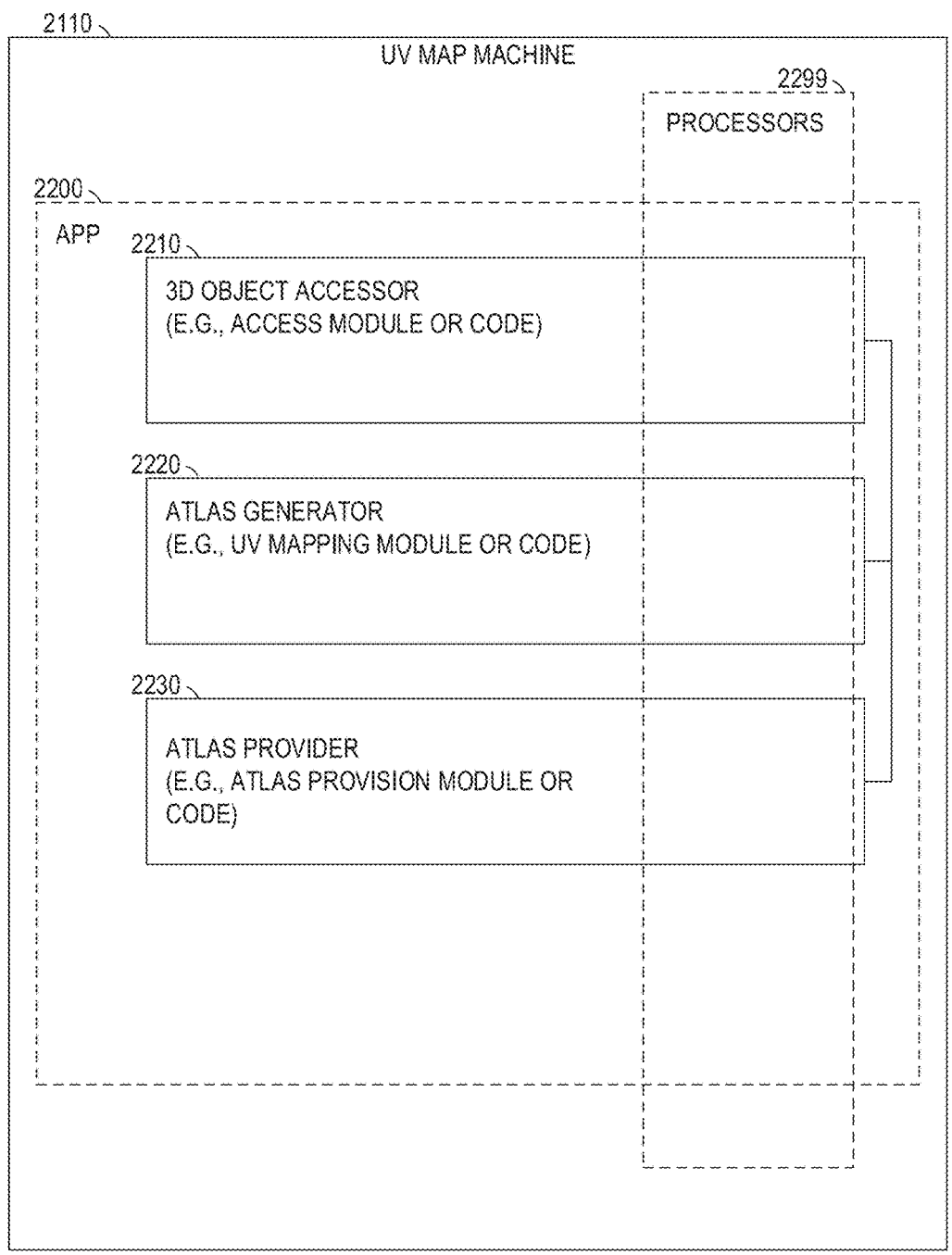
FIG. 22 is a block diagram illustrating components of a UV map machine suitable for generating an atlas or portion thereof (e.g., a UV map), according to some example embodiments.

FIG. 22 is a block diagram illustrating components of the UV map machine 2110, according to some example embodiments. The UV map machine 2110 is shown as including a 3D object accessor 2210, an atlas generator 2220, and an atlas provider 2230, all configured to communicate with each other (e.g., via a bus, shared memory, or a switch).

As shown in FIG. 22, the 3D object accessor 2210, the atlas generator 2220, the atlas provider 2230, or any suitable combination thereof, may form all or part of an app 2200 (e.g., a server-side application, a client-side application, a mobile app, or any suitable combination thereof) that is stored (e.g., installed) on the UV map machine 2110 (e.g., responsive to or otherwise as a result of data being received via the network 2190). Furthermore, one or more processors 2299 (e.g., hardware processors, digital processors, or any suitable combination thereof) may be included (e.g., temporarily or permanently) in the app 2200, the 3D object accessor 2210, the atlas generator 2220, the atlas provider 2230, or any suitable combination thereof.

Any one or more of the components (e.g., modules) described herein may be implemented using hardware alone (e.g., one or more of the processors 2299) or a combination of hardware and software. For example, any component described herein may physically include an arrangement of one or more of the processors 2299 (e.g., a subset of or among the processors 2299) configured to perform the operations described herein for that component. As another example, any component described herein may include software, hardware, or both, that configure an arrangement of one or more of the processors 2299 to perform the operations described herein for that component. Accordingly, different components described herein may include and configure different arrangements of the processors 2299 at different points in time or a single arrangement of the processors 2299 at different points in time. Each component (e.g., module) described herein is an example of a means for performing the operations described herein for that component. Moreover, any two or more components described herein may be combined into a single component, and the functions described herein for a single component may be subdivided among multiple components. Furthermore, according to various example embodiments, components described herein as being implemented within a single system or machine (e.g., a single device) may be distributed across multiple systems or machines (e.g., multiple devices).

Figure 23:
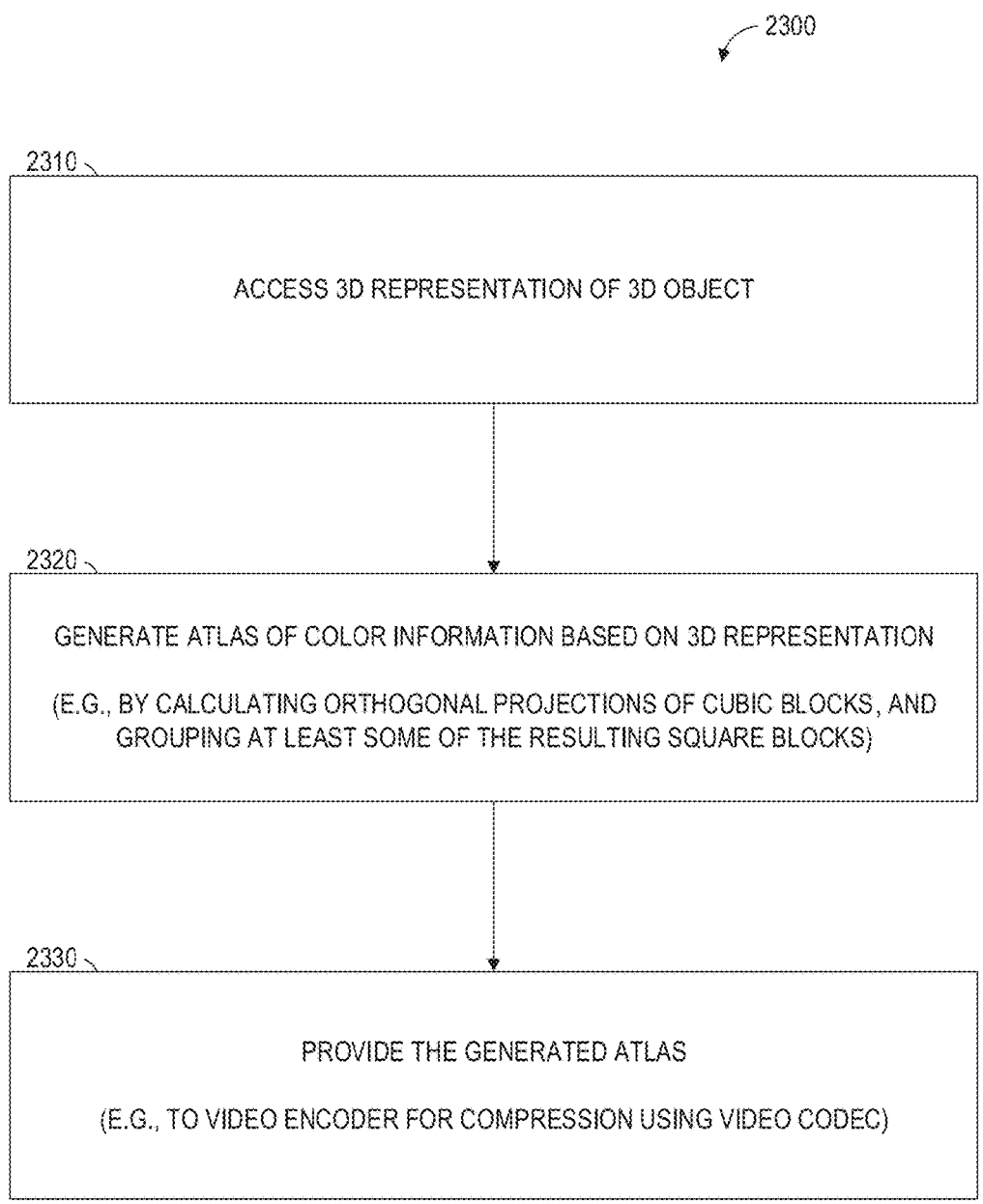
FIG. 23 is a flowchart illustrating operations of a machine in performing a method of generating an atlas or portion thereof (e.g., a UV map), according to some example embodiments.

FIG. 23 is a flowchart illustrating operations of a machine (e.g., UV map machine 2110) in performing a method 2300 of generating an atlas or portion thereof (e.g., a UV map), according to some example embodiments. Operations in the method 2300 may be performed by the UV map machine 2110, the device 2130, or any suitable combination thereof, using components (e.g., modules) described above with respect to FIG. 22, using one or more processors 2299 (e.g., microprocessors or other hardware processors), or using any suitable combination thereof. As shown in FIG. 23, the method 2300 includes operations 2310, 2320, and 2330.

In operation 2310, the 3D object accessor 2210 accesses a 3D representation of the 3D object in accordance with any one or more of the methodologies discussed herein (e.g., by accessing a database that stores such a representation in the form of a mesh, voxels, or any suitable combination thereof). Accordingly, the 3D object accessor 2210 accesses a 3D representation of a 3D object, where the 3D representation defines a 3D surface of the 3D object.

In operation 2320, the atlas generator 2220 generates an atlas according to any one or more of the methodologies described herein. Accordingly, the atlas generator 2220 may generate an atlas of color information based on the 3D representation accessed in operation 2310. For example, this may be performed by calculating orthogonal projections of cubic blocks and grouping at least some of the resulting square blocks. In some example embodiments, dominant directions of at least some of the cubic blocks are determined (e.g., to determine which face of a bounding volume is to be used for the orthogonal projection of the corresponding cubic block). Accordingly, for each cubic block that intersects the 3D surface among a plurality of cubic blocks included in a bounding volume that encompasses the 3D surface, the atlas generator 2220 may calculate an orthogonal projection of the cubic block onto a corresponding 2D face of the bounding volume, where the orthogonal projection defines a corresponding square block for the cubic block, and then group (e.g., cluster by moving) at least some of the square blocks that correspond to the orthogonally projected cubic blocks within a 2D image that specifies the color information generated based on the 3D representation of the 3D object.

In operation 2330, the atlas provider 2230 provides the generated atlas. For example, the atlas provider 2230 may provide the generated atlas to a device (e.g., device 2130) for processing (e.g., full or partial rendering), a downstream component (e.g., a video compressor or other video encoder) of the machine (e.g., UV map machine 2110) that generated the atlas, a database (e.g., database 2115) for storage, or any suitable combination thereof. Accordingly, the atlas provider 2230 provides (e.g., communicates) the generated atlas of the color information, where the generated atlas includes the grouped square blocks.

Figure 24:
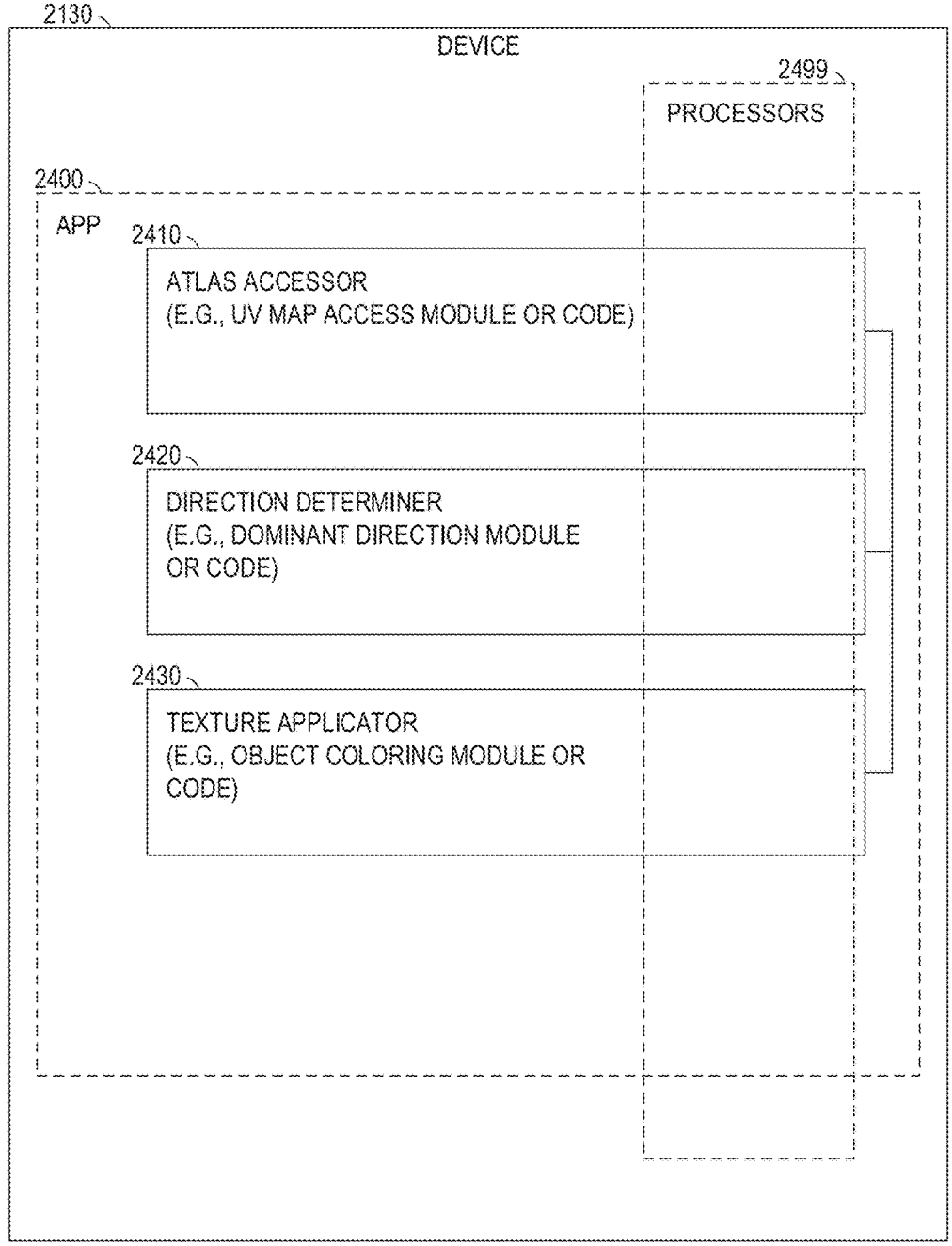
FIG. 24 is a block diagram illustrating components of a machine (e.g., a device) suitable for applying an atlas or portion thereof (e.g., a UV map) to a 3D model, according to some example embodiments.

FIG. 24 is a block diagram illustrating components of a machine (e.g., device 2130) suitable for applying an atlas or portion thereof (e.g., a UV map) generated in accordance with any one or more of the methodologies described herein to a 3D model, according to some example embodiments. In FIG. 24, the device 2130 is shown as including an atlas accessor 2410, a direction determiner 2420, and a texture applicator 2430, all configured to communicate with each other (e.g., via a bus, shared memory, or a switch).

As shown in FIG. 24, the atlas accessor 2410, the direction determiner 2420, the texture applicator 2430, or any suitable combination thereof, may form all or part of an app 2400 (e.g., a server-side application, a client-side application, a mobile app, or any suitable combination thereof) that is stored (e.g., installed) on the device 2130 (e.g., responsive to or otherwise as a result of data being received via the network 2190). Furthermore, one or more processors 2499 (e.g., hardware processors, digital processors, or any suitable combination thereof) may be included (e.g., temporarily or permanently) in the app 2400, the atlas accessor 2410, the direction determiner 2420, the texture applicator 2430, or any suitable combination thereof.

As noted above, any one or more of the components (e.g., modules) described herein may be implemented using hardware alone (e.g., one or more of the processors 2499) or a combination of hardware and software. For example, any component described herein may physically include an arrangement of one or more of the processors 2499 (e.g., a subset of or among the processors 2499) configured to perform the operations described herein for that component. As another example, any component described herein may include software, hardware, or both, that configure an arrangement of one or more of the processors 2499 to perform the operations described herein for that component. Accordingly, different components described herein may include and configure different arrangements of the processors 2499 at different points in time or a single arrangement of the processors 2499 at different points in time. Each component (e.g., module) described herein is an example of a means for performing the operations described herein for that component. Moreover, any two or more components described herein may be combined into a single component, and the functions described herein for a single component may be subdivided among multiple components. Furthermore, according to various example embodiments, components described herein as being implemented within a single system or machine (e.g., a single device) may be distributed across multiple systems or machines (e.g., multiple devices).

Figure 25:
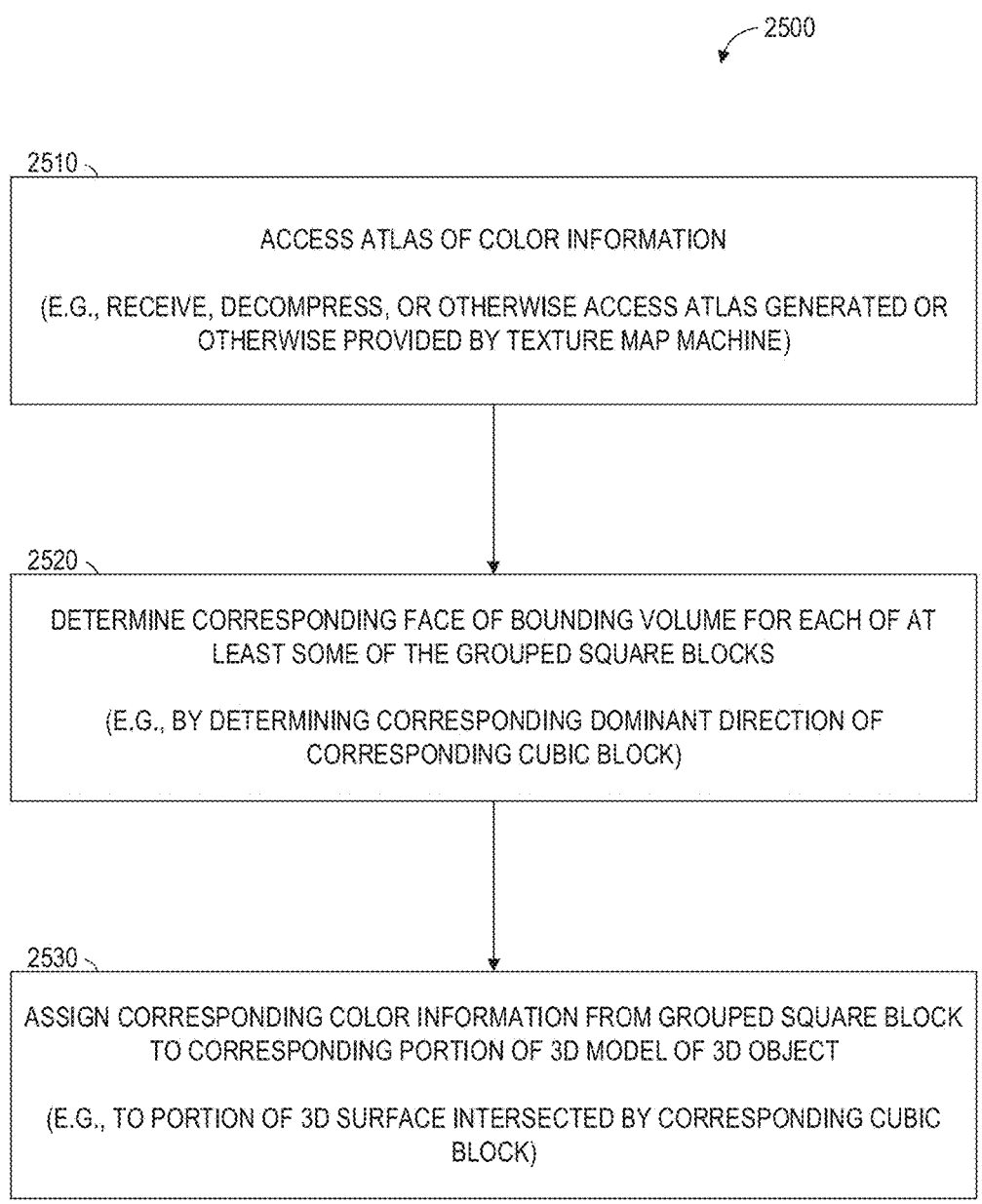
FIG. 25 is a flowchart illustrating operations of a machine (e.g., a device) in performing a method of applying an atlas or portion thereof (e.g., a UV map) to a 3D model, according to some example embodiments.

FIG. 25 is a flowchart illustrating operations of a machine (e.g., device 2130) in performing a method 2500 of applying an atlas or portion thereof (e.g., a UV map) to a 3D model, according to some example embodiments. Operations in the method 2500 may be performed by the UV map machine 2110, the device 2130, or any suitable combination thereof, using components (e.g., modules) described above with respect to FIG. 24, using one or more processors 2499 (e.g., microprocessors or other hardware processors), or using any suitable combination thereof. As shown in FIG. 25, the method 2500 includes operations 2510, 2520, and 2530.

In operation 2510, the atlas accessor 2410 accesses an atlas of color information (e.g., from the database 2115, the UV map machine 2110, the device 2150, or another suitable source). For example, the atlas accessor 2410 may receive, decompress, or otherwise access an atlas generated in accordance with the discussion above regarding FIG. 23, and the accessed atlas may have been generated by any one or more of the methodologies described herein. Accordingly, the atlas accessor 2410 may access an atlas of color information generated based on a 3D representation of a 3D object. The atlas may include grouped square blocks that represent orthogonal projections of cubic blocks included in a bounding volume that encompasses the 3D surface, and the represented cubic blocks may intersect a 3D surface of the 3D object.

In operation 2520, for each square block among the grouped square blocks, the direction determiner 2420 determines a corresponding 2D face of the bounding volume by determining a corresponding dominant direction of the corresponding cubic block that intersects a corresponding portion of the 3D surface.

In operation 2530, for each square block among the grouped square blocks, the texture applicator 2430 assigns corresponding color information to a 3D model of the corresponding portion of the 3D surface intersected by the corresponding cubic block.

According to various example embodiments, one or more of the methodologies described herein may facilitate generation, compression, decompression, storage, communication, or other processing of one or more atlases of color information generated in accordance with the methodologies described herein. Hence, one or more of the methodologies described herein may facilitate generation, compression, decompression, storage, communication, rendering, or other processing of computer graphics, including texture mapped 3D models of 3D objects, compared to capabilities of pre-existing systems and methods.

When these effects are considered in aggregate, one or more of the methodologies described herein may obviate a need for certain efforts or resources that otherwise would be involved in working with computer graphics, including atlases, UV maps, texture maps, and any suitable combination thereof. Efforts expended by a user in this regard may be reduced by use of (e.g., reliance upon) a special-purpose machine that implements one or more of the methodologies described herein. Computing resources used by one or more systems or machines (e.g., within the network environment 2100) may similarly be reduced (e.g., compared to systems or machines that lack the structures discussed herein or are otherwise unable to perform the functions discussed herein). Examples of such computing resources include processor cycles, network traffic, computational capacity, main memory usage, graphics rendering capacity, graphics memory usage, data storage capacity, power consumption, and cooling capacity.

Figure 26:
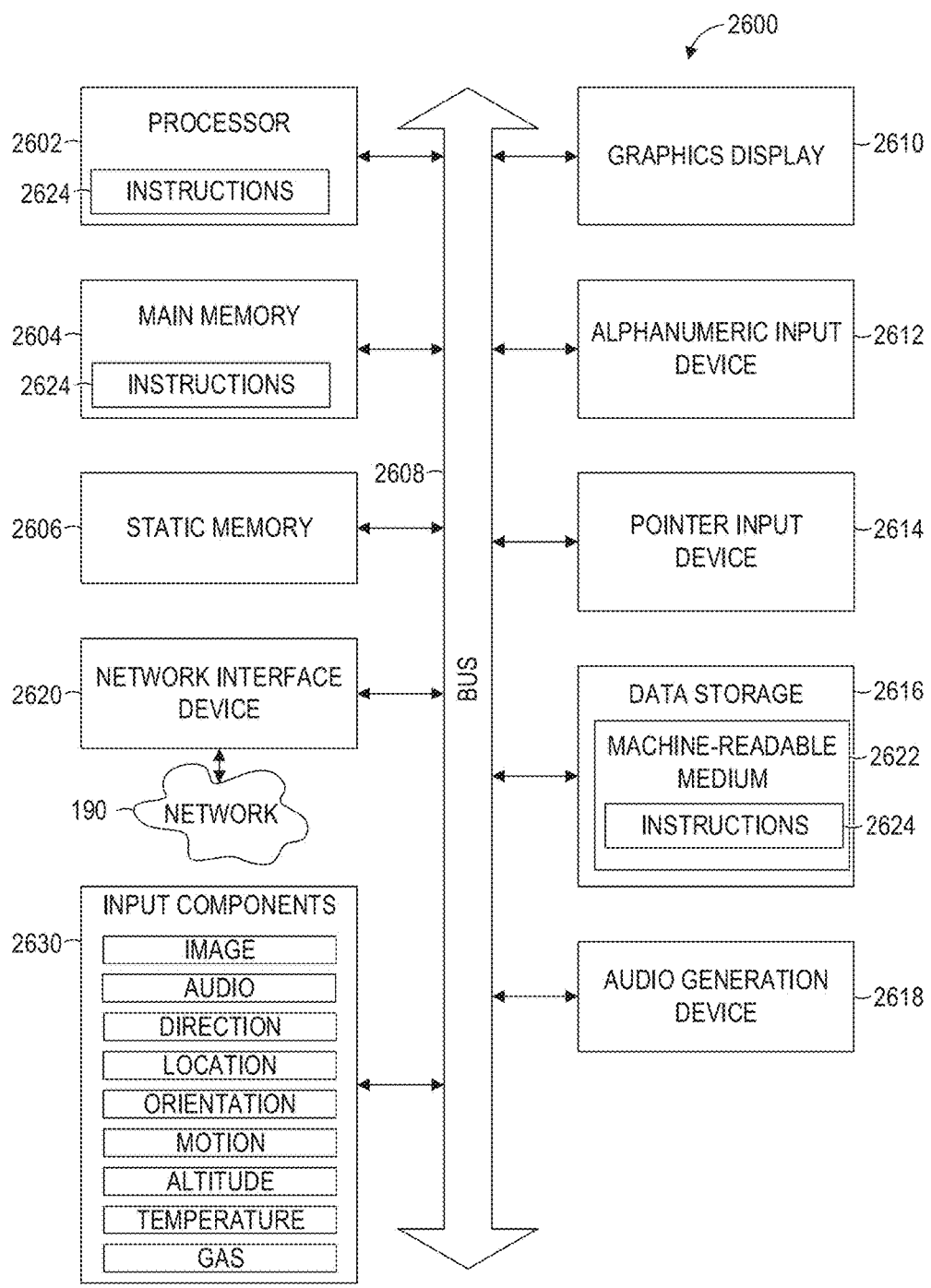
FIG. 26 is a block diagram illustrating components of a machine (e.g., device), according to some example embodiments, able to read instructions from a machine-readable medium and perform any one or more of the methodologies discussed herein.

FIG. 26 is a block diagram illustrating components of a machine 2600, according to some example embodiments, able to read instructions 2624 from a machine-readable medium 2622 (e.g., a non-transitory machine-readable medium, a machine-readable storage medium, a computer-readable storage medium, or any suitable combination thereof) and perform any one or more of the methodologies discussed herein, in whole or in part. Specifically, FIG. 26 shows the machine 2600 in the example form of a computer system (e.g., a computer) within which the instructions 2624 (e.g., software, a program, an application, an applet, an app, or other executable code) for causing the machine 2600 to perform any one or more of the methodologies discussed herein may be executed, in whole or in part.

In alternative embodiments, the machine 2600 operates as a standalone device or may be communicatively coupled (e.g., networked) to other machines. In a networked deployment, the machine 2600 may operate in the capacity of a server machine or a client machine in a server-client network environment, or as a peer machine in a distributed (e.g., peer-to-peer) network environment. The machine 2600 may be a server computer, a client computer, a personal computer (PC), a tablet computer, a laptop computer, a netbook, a cellular telephone, a smart phone, a set-top box (STB), a personal digital assistant (PDA), a web appliance, a network router, a network switch, a network bridge, or any machine capable of executing the instructions 2624, sequentially or otherwise, that specify actions to be taken by that machine. Further, while only a single machine is illustrated, the term "machine" shall also be taken to include any collection of machines that individually or jointly execute the instructions 2624 to perform all or part of any one or more of the methodologies discussed herein.

The machine 2600 includes a processor 2602 (e.g., one or more central processing units (CPUs), one or more graphics processing units (GPUs), one or more digital signal processors (DSPs), one or more application specific integrated circuits (ASICs), one or more radio-frequency integrated circuits (RFICs), or any suitable combination thereof), a main memory 2604, and a static memory 2606, which are configured to communicate with each other via a bus 2608. The processor 2602 contains solid-state digital microcircuits (e.g., electronic, optical, or both) that are configurable, temporarily or permanently, by some or all of the instructions 2624 such that the processor 2602 is configurable to perform any one or more of the methodologies described herein, in whole or in part. For example, a set of one or more microcircuits of the processor 2602 may be configurable to execute one or more modules (e.g., software modules) described herein. In some example embodiments, the processor 2602 is a multicore CPU (e.g., a dual-core CPU, a quad-core CPU, an 8-core CPU, or a 128-core CPU) within which each of multiple cores behaves as a separate processor that is able to perform any one or more of the methodologies discussed herein, in whole or in part. Although the beneficial effects described herein may be provided by the machine 2600 with at least the processor 2602, these same beneficial effects may be provided by a different kind of machine that contains no processors (e.g., a purely mechanical system, a purely hydraulic system, or a hybrid mechanical-hydraulic system), if such a processor-less machine is configured to perform one or more of the methodologies described herein.

The machine 2600 may further include a graphics display 2610 (e.g., a plasma display panel (PDP), a light emitting diode (LED) display, a liquid crystal display (LCD), a projector, a cathode ray tube (CRT), or any other display capable of displaying graphics or video). The machine 2600 may also include an alphanumeric input device 2612 (e.g., a keyboard or keypad), a pointer input device 2614 (e.g., a mouse, a touchpad, a touchscreen, a trackball, a joystick, a stylus, a motion sensor, an eye tracking device, a data glove, or other pointing instrument), a data storage 2616, an audio generation device 2618 (e.g., a sound card, an amplifier, a speaker, a headphone jack, or any suitable combination thereof), and a network interface device 2620.

The data storage 2616 (e.g., a data storage device) includes the machine-readable medium 2622 (e.g., a tangible and non-transitory machine-readable storage medium) on which are stored the instructions 2624 embodying any one or more of the methodologies or functions described herein. The instructions 2624 may also reside, completely or at least partially, within the main memory 2604, within the static memory 2606, within the processor 2602 (e.g., within the processor's cache memory), or any suitable combination thereof, before or during execution thereof by the machine 2600. Accordingly, the main memory 2604, the static memory 2606, and the processor 2602 may be considered machine-readable media (e.g., tangible and non-transitory machine-readable media). The instructions 2624 may be transmitted or received over the network 2190 via the network interface device 2620. For example, the network interface device 2620 may communicate the instructions 2624 using any one or more transfer protocols (e.g., hypertext transfer protocol (HTTP)).

In some example embodiments, the machine 2600 may be a portable computing device (e.g., a smart phone, a tablet computer, or a wearable device), and may have one or more additional input components 2630 (e.g., sensors or gauges). Examples of such input components 2630 include an image input component (e.g., one or more cameras), an audio input component (e.g., one or more microphones), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), a temperature input component (e.g., a thermometer), and a gas detection component (e.g., a gas sensor). Input data gathered by any one or more of these input components may be accessible and available for use by any of the modules described herein (e.g., with suitable privacy notifications and protections, such as opt-in consent or opt-out consent, implemented in accordance with user preference, applicable regulations, or any suitable combination thereof).

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 2622 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of carrying (e.g., storing or communicating) the instructions 2624 for execution by the machine 2600, such that the instructions 2624, when executed by one or more processors of the machine 2600 (e.g., processor 2602), cause the machine 2600 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible and non-transitory data repositories (e.g., data volumes) in the example form of a solid-state memory chip, an optical disc, a magnetic disc, or any suitable combination thereof.

A "non-transitory" machine-readable medium, as used herein, specifically excludes propagating signals per se. According to various example embodiments, the instructions 2624 for execution by the machine 2600 can be communicated via a carrier medium (e.g., a machine-readable carrier medium). Examples of such a carrier medium include a non-transient carrier medium (e.g., a non-transitory machine-readable storage medium, such as a solid-state memory that is physically movable from one place to another place) and a transient carrier medium (e.g., a carrier wave or other propagating signal that communicates the instructions 2624).

Certain example embodiments are described herein as including modules. Modules may constitute software modules (e.g., code stored or otherwise embodied in a machine-readable medium or in a transmission medium), hardware modules, or any suitable combination thereof. A "hardware module" is a tangible (e.g., non-transitory) physical component (e.g., a set of one or more processors) capable of performing certain operations and may be configured or arranged in a certain physical manner. In various example embodiments, one or more computer systems or one or more hardware modules thereof may be configured by software (e.g., an application or portion thereof) as a hardware module that operates to perform operations described herein for that module.

In some example embodiments, a hardware module may be implemented mechanically, electronically, hydraulically, or any suitable combination thereof. For example, a hardware module may include dedicated circuitry or logic that is permanently configured to perform certain operations. A hardware module may be or include a special-purpose processor, such as a field programmable gate array (FPGA) or an ASIC. A hardware module may also include programmable logic or circuitry that is temporarily configured by software to perform certain operations. As an example, a hardware module may include software encompassed within a CPU or other programmable processor. It will be appreciated that the decision to implement a hardware module mechanically, hydraulically, in dedicated and permanently configured circuitry, or in temporarily configured circuitry (e.g., configured by software) may be driven by cost and time considerations.

Accordingly, the phrase "hardware module" should be understood to encompass a tangible entity that may be physically constructed, permanently configured (e.g., hardwired), or temporarily configured (e.g., programmed) to operate in a certain manner or to perform certain operations described herein. Furthermore, as used herein, the phrase "hardware-implemented module" refers to a hardware module. Considering example embodiments in which hardware modules are temporarily configured (e.g., programmed), each of the hardware modules need not be configured or instantiated at any one instance in time. For example, where a hardware module includes a CPU configured by software to become a special-purpose processor, the CPU may be configured as respectively different special-purpose processors (e.g., each included in a different hardware module) at different times. Software (e.g., a software module) may accordingly configure one or more processors, for example, to become or otherwise constitute a particular hardware module at one instance of time and to become or otherwise constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory (e.g., a memory device) to which it is communicatively coupled. A further hardware module may then, at a later time, access the memory to retrieve and process the stored output. Hardware modules may also initiate communications with input or output devices, and can operate on a resource (e.g., a collection of information from a computing resource).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module in which the hardware includes one or more processors. Accordingly, the operations described herein may be at least partially processor-implemented, hardware-implemented, or both, since a processor is an example of hardware, and at least some operations within any one or more of the methods discussed herein may be performed by one or more processor-implemented modules, hardware-implemented modules, or any suitable combination thereof.

Moreover, such one or more processors may perform operations in a "cloud computing" environment or as a service (e.g., within a "software as a service" (SaaS) implementation). For example, at least some operations within any one or more of the methods discussed herein may be performed by a group of computers (e.g., as examples of machines that include processors), with these operations being accessible via a network (e.g., the Internet) and via one or more appropriate interfaces (e.g., an application program interface (API)). The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and their functionality presented as separate components and functions in example configurations may be implemented as a combined structure or component with combined functions. Similarly, structures and functionality presented as a single component may be implemented as separate components and functions. These and other variations, modifications, additions, and improvements fall within the scope of the subject matter herein.

Some portions of the subject matter discussed herein may be presented in terms of algorithms or symbolic representations of operations on data stored as bits or binary digital signals within a memory (e.g., a computer memory or other machine memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "accessing," "processing," "detecting," "computing," "calculating," "determining," "generating," "presenting," "displaying," or the like refer to actions or processes performable by a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated embodiments describe various example embodiments of methods, machine-readable media, and systems (e.g., machines, devices, or other apparatus) discussed herein.

A first embodiment provides a method comprising:
accessing, by one or more processors of a machine, a three-dimensional (3D) representation of a 3D object, the 3D representation defining a 3D surface of the 3D object;
generating, by one or more processors of the machine, an atlas of color information based on the 3D representation of the 3D object, the generating of the atlas including:
for each cubic block that intersects the 3D surface among a plurality of cubic blocks included in a bounding volume that encompasses the 3D surface, calculating an orthogonal projection of the cubic block onto a corresponding two-dimensional (2D) face of the bounding volume, the orthogonal projection defining a corresponding square block for the cubic block; and
grouping at least some of the square blocks that correspond to the orthogonally projected cubic blocks within a 2D image that specifies the color information generated based on the 3D representation of the 3D object; and
providing, by one or more processors of the machine, the generated atlas of the color information, the generated atlas including the grouped square blocks.

A second embodiment provides a method according to the first embodiment, wherein:
the accessing of the 3D representation of the 3D object includes accessing at least one of a 3D point cloud that defines a set of 3D points included in the 3D surface or a set of voxels that define the 3D surface.

A third embodiment provides a method according to the first embodiment or the second embodiment, wherein:
the generating of the atlas further includes:
for each cubic block that intersects the 3D surface, determining the corresponding 2D face of the bounding box by determining a corresponding dominant direction of the cubic block.

A fourth embodiment provides a method according to the third embodiment, wherein:
the generating of the atlas further includes:
for a first cubic block that intersects the 3D surface among the plurality of cubic blocks, filling an empty area of a corresponding first square block by determining its color information based on a further orthogonal projection of a second cubic block that is behind the first cubic block in the corresponding dominant direction.

A fifth embodiment provides a method according to the third embodiment or the fourth embodiment, wherein:

the determining of the corresponding dominant direction for a first cubic block among the cubic blocks is based on a comparison of occluded areas among multiple orthogonal projections of the first cubic block onto corresponding 2D faces of the bounding volume.

A sixth embodiment provides a method according to any of the first through fifth embodiments, wherein:
in the generating of the atlas, the grouping of at least some of the square blocks is performed in accordance with a space partitioning tree.

A seventh embodiment provides a method according to any of the first through sixth embodiments, wherein:
in the generating of the atlas, the grouping of at least some of the square blocks includes separately grouping square blocks defined by orthogonal projection onto each 2D face of the bounding volume.

An eighth embodiment provides a method according to any of the first through seventh embodiments, wherein:
in the generating of the atlas, the grouping of at least some of the square blocks includes:
segmenting a first region of the 2D image;
determining a ratio of foreground information to background information;
subdividing the first region of the 2D image based on a comparison of the determined ratio to a threshold ratio.

A ninth embodiment provides a method according to any of the first through eighth embodiment, wherein:
the generating of the atlas further includes:
calculating an average color of a first square block among the grouped square blocks; and
recoloring at least one empty pixel in the first square block with the calculated average color.

A tenth embodiment provides a method according to any of the first through ninth embodiments, further comprising:
performing video compression of the generated atlas of the color information, the video compression generating a data stream that includes the grouped square blocks compressed in accordance with a video codec; and wherein
the providing of the generated atlas of the color information provides the generated data stream.

An eleventh embodiment provides a method according to any of the first through tenth embodiments, wherein:
the providing of the generated atlas of the color information includes providing the grouped square blocks along with indicators of their corresponding dominant directions that indicate their corresponding faces of the bounding volume.

A twelfth embodiment provides a method comprising:
accessing, by one or more processors of a machine, an atlas of color information generated based on a three-dimensional (3D) representation of a 3D object, the atlas including grouped square blocks that represent orthogonal projections of cubic blocks included in a bounding volume that encompasses the 3D surface, the represented cubic blocks intersecting a 3D surface of the 3D object;
by one or more processors of the machine, for each square block among the grouped square blocks, determining a corresponding two-dimensional (2D) face of the bounding volume by determining a corresponding dominant direction of the corresponding cubic block that intersects a corresponding portion of the 3D surface; and
by one or more processors of the machine, for each square block among the grouped square blocks, assigning corresponding color information to a 3D model of the corresponding portion of the 3D surface intersected by the corresponding cubic block.

A thirteenth embodiment provides a method according to the twelfth embodiment, wherein:
the determining of the corresponding 2D face of the bounding volume for at least a first square block among the grouped square blocks includes accessing a data stream that includes an indicator of the corresponding dominant direction of the corresponding cubic block.

A fourteenth embodiment provides a method according to the twelfth embodiment or the thirteenth embodiment, wherein:
the determining of the corresponding 2D face of the bounding volume for at least a first square block among the grouped square blocks is based on a comparison of occluded areas among multiple orthogonal projections of the corresponding cubic block onto corresponding 2D faces of the bounding volume.

A fifteenth embodiment provides a method according to any of the twelfth through fourteenth embodiments, wherein:
the accessing of the atlas of color information includes performing video decompression of the accessed atlas of the color information, the video decompression generating a 2D image that includes the grouped square blocks decompressed in accordance with a video codec.

A sixteenth embodiment provides a machine-readable medium (e.g., a non-transitory machine-readable storage medium) comprising instructions that, when executed by one or more processors of a machine, cause the machine to perform operations comprising:
accessing a three-dimensional (3D) representation of a 3D object, the 3D representation defining a 3D surface of the 3D object;
generating an atlas of color information based on the 3D representation of the 3D object, the generating of the atlas including:
for each cubic block that intersects the 3D surface among a plurality of cubic blocks included in a bounding volume that encompasses the 3D surface, calculating an orthogonal projection of the cubic block onto a corresponding two-dimensional (2D) face of the bounding volume, the orthogonal projection defining a corresponding square block for the cubic block; and
grouping at least some of the square blocks that correspond to the orthogonally projected cubic blocks within a 2D image that specifies the color information generated based on the 3D representation of the 3D object; and
providing the generated atlas of the color information, the generated atlas including the grouped square blocks.

A seventeenth embodiment provides a system (e.g., a computer system) comprising:
one or more processors; and
a memory storing instructions that, when executed by at least one processor among the one or more processors, cause the system to perform operations comprising:
accessing a three-dimensional (3D) representation of a 3D object, the 3D representation defining a 3D surface of the 3D object;
generating an atlas of color information based on the 3D representation of the 3D object, the generating of the atlas including:
for each cubic block that intersects the 3D surface among a plurality of cubic blocks included in a bounding volume that encompasses the 3D surface, calculating an orthogonal projection of the cubic block onto a corresponding two-dimensional (2D) face of the bounding volume, the orthogonal projection defining a corresponding square block for the cubic block; and
grouping at least some of the square blocks that correspond to the orthogonally projected cubic blocks within a 2D image that specifies the color information generated based on the 3D representation of the 3D object; and providing the generated atlas of the color information, the generated atlas including the grouped square blocks.

An eighteenth embodiment provides a machine-readable storage medium (e.g., a non-transitory machine-readable storage medium) comprising instructions that, when executed by one or more processors of a machine, cause the machine to perform operations comprising:

accessing an atlas of color information generated based on a three-dimensional (3D) representation of a 3D object, the atlas including grouped square blocks that represent orthogonal projections of cubic blocks included in a bounding volume that encompasses the 3D surface, the represented cubic blocks intersecting a 3D surface of the 3D object;

for each square block among the grouped square blocks, determining a corresponding two-dimensional (2D) face of the bounding volume by determining a corresponding dominant direction of the corresponding cubic block that intersects a corresponding portion of the 3D surface; and for each square block among the grouped square blocks, assigning corresponding color information to a 3D model of the corresponding portion of the 3D surface intersected by the corresponding cubic block.

A nineteenth embodiment provides a system (e.g., a computer system) comprising:

one or more processors; and a memory storing instructions that, when executed by at least one processor among the one or more processors, cause the system to perform operations comprising:

accessing an atlas of color information generated based on a three-dimensional (3D) representation of a 3D object, the atlas including grouped square blocks that represent orthogonal projections of cubic blocks included in a bounding volume that encompasses the 3D surface, the represented cubic blocks intersecting a 3D surface of the 3D object;

for each square block among the grouped square blocks, determining a corresponding two-dimensional (2D) face of the bounding volume by determining a corresponding dominant direction of the corresponding cubic block that intersects a corresponding portion of the 3D surface; and for each square block among the grouped square blocks, assigning corresponding color information to a 3D model of the corresponding portion of the 3D surface intersected by the corresponding cubic block.

A twentieth embodiment provides a system according to the nineteenth embodiment, wherein the operations further comprise:

for each cubic block that intersects the 3D surface of the 3D object, calculating an orthogonal projection of the cubic block onto a corresponding 2D face of the bounding volume that encompasses the 3D surface, the orthogonal projection defining the corresponding square block for the cubic block.

A twenty-first embodiment provides a carrier medium carrying machine-readable instructions for controlling a machine to carry out the method of any one of the previously described embodiments.

What is claimed is:

1. A method comprising:

accessing, by one or more processors of a machine, a three-dimensional (3D) representation that defines a 3D surface of a 3D object;

generating, by one or more processors of the machine, an atlas of color information based on the 3D representation that defines the 3D surface of the 3D object, the generating of the atlas including:

encompassing the 3D surface in a bounding volume that includes a plurality of cubic blocks that subdivides the 3D surface;

for each cubic block that intersects the 3D surface among the plurality of cubic blocks included in the bounding volume, calculating a corresponding orthogonal projection of that cubic block onto a corresponding two-dimensional (2D) face of the bounding volume that encompasses the 3D surface, the orthogonal projection of that cubic block defining color information of a corresponding square block for that cubic block; and grouping at least some of the square blocks that correspond to the orthogonally projected cubic blocks within a 2D image that specifies the color information generated based on the 3D representation that defines the 3D surface of the 3D object; and providing, by one or more processors of the machine, the generated atlas of the color information, the generated atlas including the grouped square blocks.

2. The method of claim 1, wherein:

the accessing of the 3D representation that defines the 3D surface of the 3D object includes accessing at least one of a 3D point cloud that defines a set of 3D points included in the 3D surface or a set of voxels that define the 3D surface.

3. The method of claim 1, wherein:

the generating of the atlas further includes:

for each cubic block that intersects the 3D surface, determining the corresponding 2D face of the bounding volume by determining a corresponding dominant direction of that cubic block.

4. The method of claim 3, wherein:

the generating of the atlas further includes:

for a first cubic block that intersects the 3D surface among the plurality of cubic blocks, filling an empty area of a corresponding first square block by determining its color information based on a further orthogonal projection of a second cubic block that is behind the first cubic block in the corresponding dominant direction.

5. The method of claim 3, wherein:

the determining of the corresponding dominant direction for a first cubic block among the plurality of cubic blocks is based on a comparison of occluded areas among multiple orthogonal projections of the first cubic block onto corresponding 2D faces of the bounding volume.

6. The method of claim 1, wherein:

in the generating of the atlas, the grouping of at least some of the square blocks is performed in accordance with a space partitioning tree.

7. The method of claim 1, wherein:

in the generating of the atlas, the grouping of at least some of the square blocks includes separately grouping square blocks defined by orthogonal projection onto each 2D face of the bounding volume.

8. The method of claim 1, wherein:

in the generating of the atlas, the grouping of at least some of the square blocks includes:

segmenting a first region of the 2D image;

determining a ratio of foreground information to background information in the first region;

subdividing the first region of the 2D image based on a comparison of the determined ratio to a threshold ratio.

9. The method of claim 1, wherein:
the generating of the atlas further includes:
calculating an average color of a first square block among the grouped square blocks; and
recoloring at least one empty pixel in the first square block with the calculated average color.

10. The method of claim 1, further comprising:
performing video compression of the generated atlas of the color information, the video compression generating a data stream that includes the grouped square blocks compressed in accordance with a video codec; and wherein
the providing of the generated atlas of the color information provides the generated data stream.

11. The method of claim 1, wherein:
the providing of the generated atlas of the color information includes providing the grouped square blocks along with indicators of their corresponding dominant directions that indicate their corresponding 2D faces of the bounding volume.

12. A method comprising:
accessing, by one or more processors of a machine, an atlas of color information generated based on a three-dimensional (3D) representation that defines a 3D surface of a 3D object, the atlas including grouped square blocks whose color information is defined by orthogonal projections of cubic blocks included in a bounding volume that encompasses the 3D surface, the represented cubic blocks intersecting and subdividing the 3D surface of the 3D object;
by one or more processors of the machine, for each square block among the grouped square blocks, determining a corresponding two-dimensional (2D) face of the bounding volume by determining a corresponding dominant direction of the corresponding cubic block that intersects a corresponding portion of the 3D surface; and
by one or more processors of the machine, for each square block among the grouped square blocks, assigning its corresponding color information to a 3D model of the corresponding portion of the 3D surface intersected by the corresponding cubic block.

13. The method of claim 12, wherein:
the determining of the corresponding 2D face of the bounding volume for at least a first square block among the grouped square blocks includes accessing a data stream that includes an indicator of the corresponding dominant direction of the corresponding cubic block.

14. The method of claim 12, wherein:
the determining of the corresponding 2D face of the bounding volume for at least a first square block among the grouped square blocks is based on a comparison of occluded areas among multiple orthogonal projections of the corresponding cubic block onto corresponding 2D faces of the bounding volume.

15. The method of claim 12, wherein:
the accessing of the atlas of color information includes performing video decompression of the accessed atlas of the color information, the video decompression generating a 2D image that includes the grouped square blocks decompressed in accordance with a video codec.

16. The method of claim 12, further comprising:
for each cubic block that intersects the 3D surface of the 3D object, calculating an orthogonal projection of the cubic block onto a corresponding 2D face of the bounding volume that encompasses the 3D surface, the orthogonal projection defining the color information of corresponding square block for the cubic block.

17. A non-transitory machine-readable storage medium comprising instructions that, when executed by one or more processors of a machine, cause the machine to perform operations comprising:
accessing a three-dimensional (3D) representation that defines a 3D surface of a 3D object;
generating an atlas of color information based on the 3D representation that defines the 3D surface of the 3D object, the generating of the atlas including:
encompassing the 3D surface in a bounding volume that includes a plurality of cubic blocks that subdivides the 3D surface;
for each cubic block that intersects the 3D surface among the plurality of cubic blocks included in the bounding volume, calculating a corresponding orthogonal projection of that cubic block onto a corresponding two-dimensional (2D) face of the bounding volume that encompasses the 3D surface, the orthogonal projection of that cubic block defining color information of a corresponding square block for that cubic block; and
grouping at least some of the square blocks that correspond to the orthogonally projected cubic blocks within a 2D image that specifies the color information generated based on the 3D representation that defines the 3D surface of the 3D object; and
providing the generated atlas of the color information, the generated atlas including the grouped square blocks.

18. The non-transitory machine-readable storage medium of claim 17, wherein:
the generating of the atlas further includes:
for each cubic block that intersects the 3D surface, determining the corresponding 2D face of the bounding volume by determining a corresponding dominant direction of that cubic block.

19. A system comprising:
one or more processors; and
a memory storing instructions that, when executed by at least one processor among the one or more processors, cause the system to perform operations comprising:
accessing a three-dimensional (3D) representation that defines a 3D surface of a 3D object;
generating an atlas of color information based on the 3D representation that defines the 3D surface of the 3D object, the generating of the atlas including:
encompassing the 3D surface in a bounding volume that includes a plurality of cubic blocks that subdivides the 3D surface;
for each cubic block that intersects the 3D surface among the plurality of cubic blocks included in the bounding volume, calculating a corresponding orthogonal projection of that cubic block onto a corresponding two-dimensional (2D) face of the bounding volume that encompasses the 3D surface, the orthogonal projection of that cubic block defining color information of a corresponding square block for that cubic block; and
grouping at least some of the square blocks that correspond to the orthogonally projected cubic blocks within a 2D image that specifies the color information generated based on the 3D representation that defines the 3D surface of the 3D object; and providing the generated atlas of the color information, the generated atlas including the grouped square blocks.

20. The system of claim 19, wherein:

in the generating of the atlas, the grouping of at least some of the square blocks includes:
- segmenting a first region of the 2D image;
- determining a ratio of foreground information to background information in the first region;
- subdividing the first region of the 2D image based on a comparison of the determined ratio to a threshold ratio.

* * * * *

UNITED STATES PATENT AND TRADEMARK OFFICE
CERTIFICATE OF CORRECTION

PATENT NO. : 10,242,484 B1
APPLICATION NO. : 15/786298
DATED : March 26, 2019
INVENTOR(S) : Cernigliaro et al.

Page 1 of 2

It is certified that error appears in the above-identified patent and that said Letters Patent is hereby corrected as shown below:

On the Title Page

In item (22), in "Filed", in Column 1, Line 1, after "2017", insert --¶(65) Prior Publication Data US 2019/0114821 A1 Apr. 18, 2019--

On page 2, in Column 1, under "Other Publications", Line 7, delete "Ef?ciency" and insert --Efficiency-- therefor In the Specification In Column 1, Line 49, delete "$(x, y, z) \in \mathcal{J}$." and insert --$(x, y, z) \in \mathcal{S}$.-- therefor In Column 1, Lines 65-66, delete "$\mathcal{V} = \{(i_m, j_m, k_m)\}$" and insert --$\mathcal{F} = \{(i_m, j_m, k_m)\}$-- therefor In Column 10, Line 4, delete "$SB \in \mathbb{R}^2$:" and insert --$SB \in \mathbb{R}^2$.-- therefor In Column 10, Line 23, delete "$\tilde{B}_y \subset B_y : \tilde{B}_y = \{B_i : y_i = \min_j y_j \vee y_i = \max_j x_j\}$" and insert --$\tilde{B}_y \subset B_y : \tilde{B}_y = \{B_i : y_i = \min_j y_j \vee y_i = \max_j y_j\}$-- therefor In Column 10, Line 25, delete "$\tilde{B}_z \subset B_z : \tilde{B}_z = \{B_i : z_i = \min_j z_j \vee z_i = \max_j x_j\}$" and insert --$\tilde{B}_z \subset B_z : \tilde{B}_z = B_i : z_i = \min_j z_j \vee z_i = \max_j z_j\}$-- therefor In Column 10, Line 31, delete "$\{\tilde{B}x_i = \max_j x_j\}$" and insert --$\{\tilde{B}_i : x_i = \max_j x_j\}$-- therefor In Column 10, Line 34, delete "$\{\tilde{B}y_i = \max_j y_j\}$" and insert --$\{\tilde{B}_i : y_i = \max_j y_j\}$-- therefor In Column 10, Line 37, delete "$\{\tilde{B}z_i = \max_j z_j\}$" and insert --$\{\tilde{B}_i : z_i = \max_j z_j\}$-- therefor Signed and Sealed this
Fifth Day of May, 2020

Andrei Iancu
*Director of the United States Patent and Trademark Office*

CERTIFICATE OF CORRECTION (continued)
U.S. Pat. No. 10,242,484 B1

In Column 13, Line 40, delete "$\hat{J}=(J-i_{min})+[2^{nj}-((J-i_{min}))]$" and insert --$\hat{J} = (J - j_{min}) + [2^{n_j} - ((J - j_{min}))]$-- therefor In Column 13, Line 59, delete "( $\hat{I}_1$, $\hat{J}_1$)," and insert --($\hat{I}_1$, $\hat{J}_1$),-- therefor In Column 15, Line 26, delete "$\forall\{\acute{Z} \subset Z: I_{\acute{Z}} > \tilde{I} \wedge J_{\acute{Z}} > \tilde{J}\}$" and insert --$\exists\{\tilde{Z} \subset Z: I_{\tilde{Z}} > \tilde{I} \wedge J_{\tilde{Z}} > \tilde{J}\}$-- therefor